US009731299B2

(12) United States Patent
Segawa et al.

(10) Patent No.: US 9,731,299 B2
(45) Date of Patent: Aug. 15, 2017

(54) METHOD AND APPARATUS FOR SEPARATING SOLVENT

(71) Applicant: Panasonic Intellectual Property Management Co., Ltd., Osaka (JP)

(72) Inventors: Terutsugu Segawa, Osaka (JP); Koichi Nagai, Kyoto (JP); Naofumi Hino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 117 days.

(21) Appl. No.: 14/529,678

(22) Filed: Oct. 31, 2014

(65) Prior Publication Data

US 2015/0122123 A1 May 7, 2015

(30) Foreign Application Priority Data

Nov. 6, 2013 (JP) ................................ 2013-230348
Dec. 27, 2013 (JP) ................................ 2013-272020
Jul. 8, 2014 (JP) ................................ 2014-140627

(51) Int. Cl.
*B03C 3/017* (2006.01)
*B03C 3/06* (2006.01)
(Continued)

(52) U.S. Cl.
CPC ................ *B03C 3/017* (2013.01); *B03C 3/06* (2013.01); *B03C 3/15* (2013.01); *B03C 3/361* (2013.01); *B03C 3/368* (2013.01); *B03C 3/49* (2013.01)

(58) Field of Classification Search
CPC .. B03C 3/017; B03C 3/06; B03C 3/49; B03C 3/361; B03C 3/368; B03C 3/15
See application file for complete search history.

(56) References Cited

U.S. PATENT DOCUMENTS 2,547,874 A 4/1951 Klema
3,154,682 A * 10/1964 Hartz ................. C01B 23/0005 95/78
(Continued)

FOREIGN PATENT DOCUMENTS

CN 2635192 8/2004
CN 1642619 7/2005
(Continued)

OTHER PUBLICATIONS

Sang-Jun Han, "Carbon Dioxide Capture Using Calcium Hydroxide Aqueous Solution as the Absorbent", Jul. 2011, Gyeonggi-do 420-743 https://web.archive.org/web/20151127041633/http://www.researchgate.net/publication/231272927_Carbon_Dioxide_Capture_Using_Calcium_Hydroxide_Aqueous_Solution_as_the_Absorbent.*
(Continued)

*Primary Examiner* — Amber R Orlando
*Assistant Examiner* — Britanny Precht
(74) *Attorney, Agent, or Firm* — Wenderoth, Lind & Ponack, L.L.P.

(57) ABSTRACT

An electrode is arranged on one wall surface of a flow path of an exhaust atmosphere in a solvent separating apparatus, an electric field is applied to vaporized solvent in the exhaust atmosphere so as to concentrate only the solvent in the exhaust atmosphere in the direction toward the electric field, and the solvent is discharged to the outside of the solvent separating apparatus together with a portion of the exhaust atmosphere in the periphery of the solvent.

6 Claims, 14 Drawing Sheets

(51) Int. Cl.

| | |
|---|---|
| ***B03C 3/49*** | (2006.01) |
| ***B03C 3/36*** | (2006.01) |
| ***B03C 3/15*** | (2006.01) |

(56) References Cited

U.S. PATENT DOCUMENTS

| | | | | |
|---|---|---|---|---|
| 4,066,526 | A * | 1/1978 | Yeh | B03C 3/155<br>204/554 |
| 4,999,998 | A * | 3/1991 | Akerib | B01D 53/323<br>55/DIG. 30 |
| 5,012,793 | A * | 5/1991 | Guzorek | F23J 13/025<br>126/293 |
| 6,730,141 | B2 * | 5/2004 | Oberpriller | B03C 3/016<br>422/121 |
| 8,329,125 | B2 * | 12/2012 | Nicholson | B01D 53/83<br>422/105 |
| 2005/0178270 | A1 | 8/2005 | Ito et al. | |
| 2007/0243119 | A1 * | 10/2007 | Downs | B01D 53/002<br>423/210 |
| 2008/0202341 | A1 | 8/2008 | Poole et al. | |

FOREIGN PATENT DOCUMENTS

| | | |
|---|---|---|
| CN | 101124031 | 2/2008 |
| JP | 8-112812 | 5/1996 |
| JP | 11-28330 | 2/1999 |
| JP | 2001-70743 | 3/2001 |
| JP | 2004-301373 | 10/2004 |
| JP | 2006-87972 | 4/2006 |

OTHER PUBLICATIONS

Office Action issued Mar. 28, 2016 in Chinese Application No. 201410612563.6, with partial English translation.

* cited by examiner

METHOD AND APPARATUS FOR SEPARATING SOLVENT

BACKGROUND OF THE INVENTION

The present invention relates to a solvent separating method and apparatus of removing a solvent from a gas containing a vaporized solvent to purify the gas.

Recently, in steps of assembling and manufacturing various industrial products or household appliances or insteps of manufacturing devices which form constitutional parts of these products such as various electronic parts, various batteries or substrates, materials in a paste form having various functions are applied to devices and, then, heat treatment is performed by various heat treatment apparatuses. Here, examples of various heat treatment apparatuses include a drying furnace, a baking furnace, a curing furnace, or a reflow furnace used in soldering in an electronic part mounting step or the like. In each material in a paste form, in addition to solid components which are necessary to be contained in a final product, to apply these solid components on to various substrates or base materials, depending on various purposes and necessities, various solvents such as water or an organic solvent are mixed for viscosity adjustment or adjustment of performances.

In a heating step using a heat treatment apparatus, these solvents are discharged into the inside of the apparatus from the material in a paste form through a vaporization step and a solvent removing step. Accordingly, when heat treatment is performed continuously, the solvents are continuously vaporized and discharged into the inside of the apparatus. As a result, the concentration of the solvent in an atmosphere in the apparatus is increased, thus giving rise to a possibility that various drawbacks may take place. For example, along with the increase of solvent concentration in an atmosphere in the apparatus, an amount of solvent which can be present in the atmosphere at a temperature in the inside of the apparatus approaches a saturated state. As a result, drying of an object to be subjected to heat treatment becomes difficult. When the solvent has an explosive property, even when the solvent does not reach a saturated vapor pressure, there is a possibility that the concentration of the vaporized solvent exceeds an explosion limit. Accordingly, it is necessary to periodically or continuously supply outside air into the inside of the apparatus from the outside of the apparatus. Further, when a nitrogen gas or other atmospheres (atmospheric gases) are necessary, it is necessary to supply these atmospheres to the inside of the apparatus from the outside of the apparatus. In addition, a unit is also adapted for discharging, to the outside of the apparatus, the atmospheres in the apparatus where the solvent concentration is increased. FIG. 19 is a view for describing the supply and discharge of an atmosphere. Outside air is supplied to the inside of a heat treatment apparatus 1 by a supply blower 2. A part of atmosphere in the heat treatment apparatus 1 which contains a solvent vaporized in the inside of the heat treatment apparatus 1 is discharged to the outside of the apparatus by an exhaust blower 3. However, some solvents contained in the atmosphere and discharged to the outside of the heat treatment apparatus 1 are harmful, and there is a concern on the influence which the solvent applies to environments. In view of the above, to eliminate the influence which a solvent discharged to the outside of the heat treatment apparatus 1 and contained in a discharge atmosphere exerts on the environment such as atmospheric contamination or the influence which the solvent exerts on a health of an operator, as a method of removing a solvent from a discharge atmosphere when necessary, a method described in Patent Literature 1, for example, is known.

FIG. 20 is an explanatory view of Patent Literature 1. In this Patent Literature 1, a cooler 5 is communicated with a heat treatment apparatus 1 through a heat-treatment-apparatus inner exhaust duct 4, and a heat-treatment-apparatus outer exhaust duct 6 and a mist collector 7 are sequentially arranged in a communicating manner with the cooler 5. By cooling an exhaust atmosphere discharged from the inside of the heat treatment apparatus 1 and contains a solvent by the cooler 5, the solvent in the heat-treatment-apparatus inner atmosphere is liquefied and coagulated. Next, the atmosphere is discharged to a further downstream side through the outer exhaust duct 6 of the heat treatment apparatus, and the liquefied and coagulated solvent is collected by the mist collector 7 arranged in a communicable manner with the outer exhaust duct 6 of the heat treatment apparatus, so that the exhaust atmosphere is purified, and the purified atmosphere can be discharged to the outside of the heat treatment apparatus.

Further, as a method of removing a vaporized solvent, particularly water vapor contained in exhaust air, there has been known a method described in Patent Literature 2. FIG. 21 is an explanatory view of Patent Literature 2. The apparatus disclosed in Patent Literature 2 has the following constitution. A charge electrode 8 and an attraction electrode 9 are configured to be rotatable about a first rotary shaft 11 and a second rotary shaft 12 respectively, and the first rotary shaft 11 and the second rotary shaft 12 are connected to a drive motor 10 by way of a first drive transmission belt 13 and a second drive transmission belt 14 respectively. By driving the drive motor 10, the charge electrode 8 and the attraction electrode 9 are rotated. In such a constitution, to increase a contact area between the charge electrode 8 and the exhaust 22 and a contact area between the attraction electrode 9 and the exhaust 22, through holes 8*a* are formed in the charge electrode 8 and through holes 9*a* are formed in the attraction electrode 9. In the method disclosed in Patent Literature 2, when a solvent in the supplied exhaust 22 is vaporized, the solvent is not liquefied and coagulated through cooling. That is, a solvent vaporized on an upstream side of an exhaust flow path is charged by being brought into contact with the rotating charge electrode 8, and is moved in the direction toward the attraction electrode 9 on a downstream side of the flow path. Then, the vaporized solvent is induced by the attraction electrode 9 which has a charge of polarity opposite to polarity of a charged solvent and which rotates, and the solvent is attracted by the attraction electrode 9. The solvent attracted by the attraction electrode 9 is collected by a water droplet collector 15 due to a centrifugal force generated by the attraction electrode 9.

CITATION LIST (Patent Literature 1) Japanese Unexamined Patent Publication No. 2004-301373

(Patent Literature 2) Japanese Unexamined Patent Publication No. 2006-87972

SUMMARY OF THE INVENTION

However, in the constitution disclosed in Patent Literature 1, the solvent is liquefied and coagulated after being cooled in the exhaust by the cooler and hence, it is necessary to take away enormous energy used for heating an atmosphere in the heat treatment apparatus to a high temperature in the cooling step by the cooler. In the constitution disclosed in Patent Literature 2, unless the exhaust atmosphere is cooled to a temperature at which a solvent (water vapor) condensates in a water-droplet shape at a point of time that the solvent is attracted by the attraction electrode in an exhaust path, even when the solvent is attracted by the attraction electrode after the solvent is charged by the charge electrode, the solvent is again vaporized to be water vapor and is discharged to a downstream of the attraction electrode.

The present invention has been made in view of the above-mentioned points, and it is an object of the present invention to provide a solvent separating method and apparatus which purifies an exhaust atmosphere by removing a solvent in a gaseous state without liquefying using energy for cooling in the removal of the solvent from an exhaust atmosphere containing the solvent vaporized by heat discharged from an exhaust generation apparatus such as a heat treatment apparatus.

In accomplishing these and other aspects, according to a first aspect of the present invention, there is provided a method of separating a vaporized solvent having polarity from a gas containing the solvent, the method comprising:

flowing the gas in a fixed direction in a flow path in a solvent separating apparatus;

applying an electric field to the gas in a direction which intersects with a direction along which the gas flows due to an electrode arranged in the flow path of the gas in an extending manner along the direction that the gas flows, and thus collecting the solvent contained in the gas within a fixed region in the flow path; and separating the gas containing the collected solvent from the gas which does not contain the solvent outside the fixed region and discharging the separated gas.

According to a second aspect of the present invention, there is provided the solvent separating method according to the first aspect, wherein the gas containing the vaporized solvent having the polarity is a heated gas which is generated in the exhaust generating apparatus by heating in the exhaust generating apparatus and is discharged from the exhaust generating apparatus.

According to a third aspect of the present invention, there is provided the solvent separating method according to the first or second aspect, wherein a gas from which the solvent is separated thus not containing the solvent is separated from the gas containing the solvent, and the gas not containing the solvent is supplied to an inside of the exhaust generating apparatus from the solvent separating apparatus and is circulated in the inside of the exhaust generating apparatus.

According to a fourth aspect of the present invention, there is provided the solvent separating method according to the third aspect, wherein the gas containing the vaporized solvent flows through a path from the exhaust generating apparatus to the solvent separating apparatus in a state where a path through which the gas is circulated between the exhaust generating apparatus and the solvent separating apparatus is thermally insulated from outside air by a heat insulating material, and a gas from which the solvent is removed flows through a path from the solvent separating apparatus to the exhaust generating apparatus According to a fifth aspect of the present invention, there is provided a solvent separating apparatus for separating a vaporized solvent having polarity from a gas containing the solvent, the solvent separating apparatus comprising:

a cylindrical member capable of forming a flow path through which the gas flows in a fixed direction;

an electrode electrically insulated from the cylindrical member and arranged in an extending manner along a direction that the gas flows;

a voltage applying apparatus that applies a voltage to the electrode, thus generating an electric field in a direction which intersects with a direction that the gas flows so as to collect the solvent contained in the gas within a fixed region in the flow path;

a first exhaust duct connected to an outlet of the flow path and discharging a first exhaust atmosphere containing the solvent collected in a vicinity of the electrode; and a second exhaust duct connected to the outlet of the flow path and discharging a second exhaust atmosphere containing no solvent, wherein the electric field is applied to the gas flowing in the flow path by the voltage applying apparatus to collect the solvent contained in the gas within the fixed region in the flow path, the first exhaust atmosphere which is the collected gas and contains the solvent is discharged from the first exhaust duct, and the second exhaust atmosphere which does not contain the solvent is discharged from the second exhaust duct to separate the solvent.

As has been explained heretofore, in the solvent separating methods and apparatuses according to the first to fifth aspects of the present invention, even in the removal of a vaporized solvent contained in an exhaust atmosphere discharged from the heat treatment furnace apparatus for heating, the solvent can be separated without cooling the exhaust atmosphere.

According to a sixth aspect of the present invention, there is provided the solvent separating apparatus according to the fifth aspect, wherein the electrode is arranged in an inside of the flow path of the cylindrical member, the electrode being arranged extending to an inside of the first exhaust duct such that the electrode intersects with a direction that the gas flows, and the electrode is arranged in the inside of the flow path of the cylindrical member such that when the electric field generated by applying the voltage to the electrode by the voltage applying apparatus is integrated from a position of a leading end of the flow path before being branched into the second exhaust duct and the first exhaust duct in cross section in a direction orthogonal to a direction that the gas flows to a position of the outlet, all cross sections in a direction orthogonal to a direction that the gas flows fall within a range of the electric field.

According to a seventh aspect of the present invention, there is provided the solvent separating apparatus according to the fifth aspect, wherein the electrode is formed of at least two arranged electrodes.

According to an eighth aspect of the present invention, there is provided the solvent separating apparatus according to the seventh aspect, wherein the at least two electrodes are constituted of at least one electrode to which a positive voltage is applied and at least one electrode to which a negative voltage is applied.

According to a ninth aspect of the present invention, there is provided the solvent separating apparatus according to the sixth aspect, wherein the electrode is formed of at least two arranged electrodes.

According to a tenth aspect of the present invention, there is provided the solvent separating apparatus according to the ninth aspect, wherein the at least two electrodes are constituted of at least one electrode to which a positive voltage is applied and at least one electrode to which a negative voltage is applied.

According to an eleventh aspect of the present invention, there is provided the solvent separating apparatus according to any one of the fifth to tenth aspects, further comprising:

an exhaust generating apparatus which is a generation source of the gas containing the vaporized solvent having the polarity; and a circulation flow path which has an upstream side of the flow path through which the gas flows connected to an exhaust port of the exhaust generating apparatus and has the second exhaust duct connected to a supply port of a gas to the exhaust generating apparatus.

According to a twelfth aspect of the present invention, there is provided the solvent separating apparatus according the twelfth aspect, wherein a circulation duct of the circulation flow path is configured to be thermally insulated from outside air by a heat insulating material.

As has been explained heretofore, in the solvent separating apparatuses of the sixth to twelfth aspects of the present invention, in the removal of a solvent from an exhaust atmospheric gas containing the solvent vaporized by heat discharged from the exhaust generation apparatus, the exhaust atmospheric gas can be purified by removing the solvent in a gaseous state without liquefying the solvent using energy for cooling.

BRIEF DESCRIPTION OF THE DRAWINGS

These and other aspects and features of the present invention will become clear from the following description taken in conjunction with the preferred embodiments thereof with reference to the accompanying drawings, in which.

DESCRIPTION OF EMBODIMENTS

Hereinafter, embodiments of the present invention are described with reference to drawings.

First Embodiment

Figure 1:
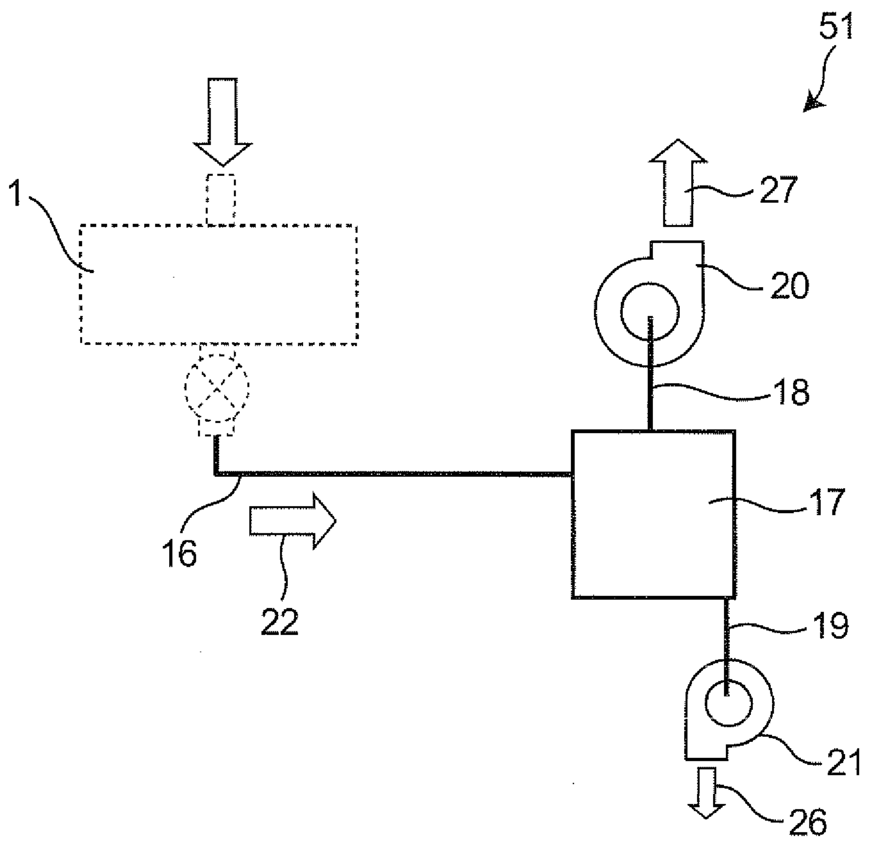
FIG. 1 is an explanatory view of a solvent separating apparatus including a solvent separating unit where a solvent separating method according to a first embodiment of the present invention can be performed.

FIG. 1 is an explanatory view of a solvent separating apparatus 51 where a solvent separating method according to a first embodiment of the present invention can be performed. The solvent separating apparatus 51 is connected to a heat treatment apparatus 1 which constitutes one example of an exhaust generating apparatus. The solvent separating apparatus 51 includes: an exhaust duct 16; a solvent separating unit 17; a first exhaust duct 19; a second exhaust duct 18; a first exhaust blower 21; and a second exhaust blower 20.

The heat treatment apparatus 1 is formed of a furnace where a heat treatment is performed such as a baking furnace, a drying furnace, a curing furnace, or a reflow furnace, for example. In the heat treatment, heating is performed corresponding to various materials or members which are objects to be heated. A solvent is vaporized in an atmosphere (gas or atmospheric gas) in the inside of the heat treatment apparatus 1 by such heating. A part of the atmosphere containing the vaporized solvent in the inside of the heat treatment apparatus is introduced into the exhaust duct 16 arranged in a communicably connected manner with the heat treatment apparatus 1.

The solvent separating unit 17 is communicably connected to a downstream side of the exhaust duct 16. An exhaust atmosphere is fed to the inside of the solvent separating unit 17 from the heat treatment apparatus 1 through the exhaust duct 16. As described in detail later, gas molecules of the vaporized solvent 23 having a polarity in the exhaust atmosphere are separated from gas molecules of gases other than the solvent in the exhaust atmosphere due to the electrostatic induction generated by an electric field. As a result, the exhaust atmosphere is separated into an exhaust atmosphere containing no solvent 23 and an exhaust atmosphere containing the solvent 23 so that a concentration of the solvent becomes non-uniform in the exhaust atmosphere. In this embodiment, the electrostatic induction means a phenomenon where a positively charged substance is attracted by a negative charge, and a negatively charged substance is attracted by a positive charge.

The exhaust atmosphere containing no solvent and the exhaust atmosphere containing the solvent which are separated from each other in the solvent separating unit 17 in this manner are respectively introduced into the first exhaust duct 19 and the second exhaust duct 18 which are formed of separate members and communicably connected to the solvent separating unit 17. The exhaust atmosphere containing no solvent is discharged to a second exhaust blower 20 side through the second exhaust duct 18, and is discharged to the outside of the solvent separating unit 17 by the second exhaust blower 20. On the other hand, the exhaust atmosphere containing the solvent is discharged to the outside of the solvent separating unit 17 through the first exhaust duct 19 by the first exhaust blower 21 in a system different from the second exhaust blower 20. In such a case, a negative pressure on a suction side of the first exhaust blower 21 is set equal to a negative pressure on a suction side of the second exhaust blower 20. The negative pressure on the suction side of the first exhaust blower 21 and the negative pressure on the suction side of the second exhaust blower 20 are set equal to each other for allowing two separated exhaust atmospheres 26, 27 to be smoothly discharged from the first exhaust duct 19 and the second exhaust blower 20, respectively.

Figure 2:
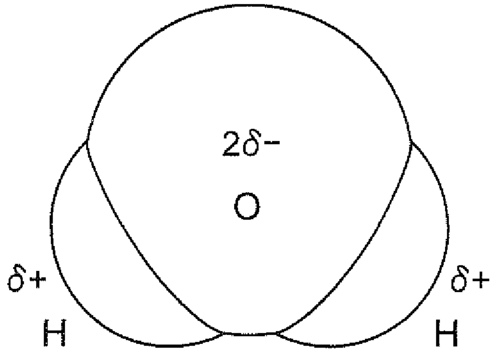
FIG. 2 is an enlarged explanatory view of the molecular structure of water.

FIG. 2 shows the molecular structure of water. As shown in FIG. 2, water has polarities due to the molecular structure of water and hence, water is electrically biased. The same goes for other solvents such as ethanol. A substance which is generally used as a solvent has a polarity due to the molecular structure thereof as described above so that the substance has a property which easily dissolves other substances and hence, the substance is used as a solvent. That is, it can be said that most of the substances used as a solvent have a polarity. When molecules of such a substance having a polarity are placed in an electric field, irrespective of whether an electrode which generates an electric field is a positive electrode or a negative electrode, the molecules are attracted to the electrode due to the electrostatic induction.

This is because, due to the electrostatic induction, when an electrode is positively charged, a side of a water molecule which is negatively biased is attracted to the electrode, while when an electrode is negatively charged, a side of the water molecule which is positively biased is attracted to the electrode.

Figure 3A:
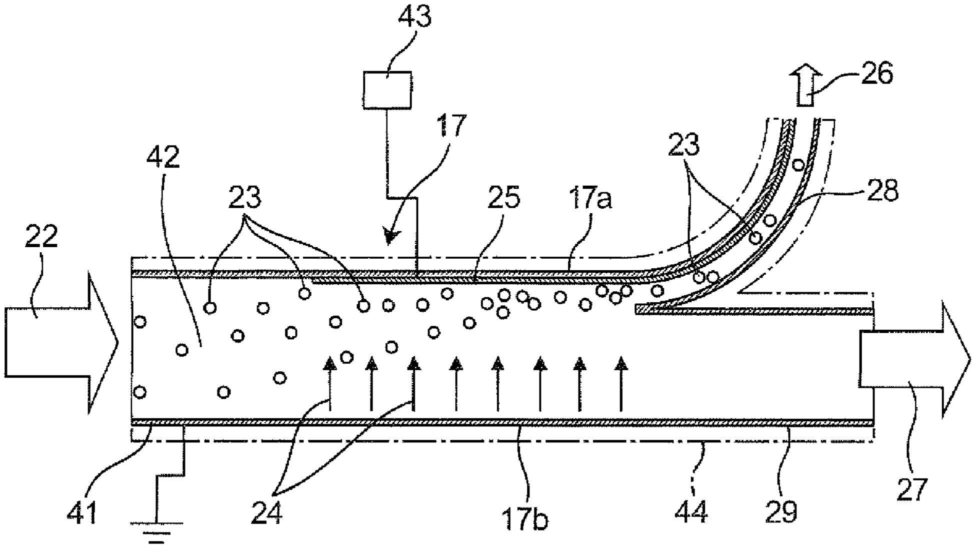
FIG. 3A is a plan view of the solvent separating unit for describing the solvent separating method according to the first embodiment of the present invention.
Figure 3B:
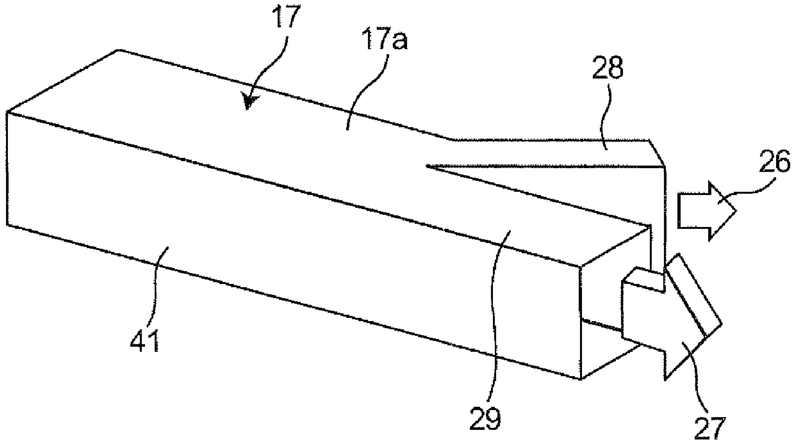
FIG. 3B is a perspective view of the solvent separating unit shown in FIG. 3A.

FIG. 3A and FIG. 3B are explanatory views of a solvent separating method according to the first embodiment of the present invention. In this solvent separating method, an exhaust atmosphere 22 is discharged from the heat treatment apparatus 1 and is supplied to the solvent separating unit 17, and the exhaust atmosphere 22 contains a solvent 23 having a polarity. Then, a function of separating the solvent 23 from the exhaust atmosphere 22 in the inside of the solvent separating unit 17 is explained hereinafter. The solvent separating unit 17 includes: a quadrangular cylindrical member 41; an electrode 25; a voltage applying apparatus 43; a first exhaust duct 28; and a second exhaust duct 29.

Firstly, for example, a flow path 42 having a quadrangular columnar shape is formed in the quadrangular cylindrical member 41 of the solvent separating unit 17. The exhaust atmosphere 22 flows through the flow path 42 in a fixed direction. The electrode 25 is formed on one of first wall surfaces (an inner wall surface, for example) 17*a* of the quadrangular cylindrical member such that the electrode 25 extends in a direction along which the exhaust atmosphere 22 flows. A voltage canoe applied to the electrode 25 by the voltage applying apparatus 43. A magnitude of voltage to be applied is appropriately decided by taking into account a concentration of solvent, an arrangement length of the electrode, a flow rate of the exhaust atmosphere 22, or a size of the flow path 42. Further, a second wall surface 17*b* arranged on a side opposite to the first wall surface 17*a* is insulated from the electrode 25 and is connected to a ground.

The first exhaust duct 28 is provided to a portion of the solvent separating unit 17 on an outlet side of the flow path 42 along the first wall surface 17*a*. As described later, the first exhaust atmosphere 26 which contains the solvent 23 concentrated in the vicinity of the electrode 25 can be discharged to the outside of the solvent separating unit 17 through the first exhaust duct 28. The second exhaust duct 29 is provided to the solvent separating unit 17 along the second wall surface 17*b*. As described later, the remaining exhaust atmosphere, that the second exhaust atmosphere 27 can be discharged to the outside of the solvent separating unit 17 through the second exhaust duct 29. The solvent separating unit 17 is configured such that the outlet side of the solvent separating unit 17 is branched into the first exhaust duct 28 and the second exhaust duct 29. The first exhaust duct 28 constitutes one example of the first exhaust duct 19 shown in FIG. 1, and the second exhaust duct 29 constitutes one example of the second exhaust blower 20 shown in FIG. 1. In this embodiment, as one example, the second exhaust duct 29 is formed on the outlet side of the solvent separating unit 17 with an opening area larger than an opening area of the first exhaust duct 28. The electrode 25 is formed such that the electrode 25 extends over the first wall surface 17*a* and reaches at least a branched portion on a wall surface of the first exhaust duct 28 which is contiguously formed from the first wall surface 17*a*.

Due to such a constitution, a potential difference is generated between the second wall surface 17*b* and the electrode 25 which is arranged on the first wall surface 17*a* disposed on a side opposite to the second wall surface 17*b* so that an electric field 24 is generated in the solvent separating unit 17. The electric field 24 is generated in the direction perpendicular to the direction along which a gas flows.

When the solvent 23 which has a polarity in the molecular structure reaches a region where an electric field 24 influences the solvent 23, the solvent 23 is induced in one direction, to be more specific, in the direction toward the electrode 25 in FIG. 3A due to the electrostatic induction. In the same manner, respective molecules of the vaporized solvent 23 contained in the exhaust atmosphere 22 are attracted to an electrode 25 side due to the electrostatic induction. As a result, the solvent 23 in the exhaust atmosphere 22 is concentrated in a fixed region in the vicinity of the electrode 25 through a predetermined path length. Then, the first exhaust atmosphere 26 containing the solvent 23 which is concentrated in an area in the vicinity of the electrode 25 is discharged to the outside of the solvent separating unit 17 through the first exhaust duct 28. On the other hand, the purified second exhaust atmosphere 27 containing no solvent 23 is discharged to the outside of the solvent separating unit 17 through a path different from the first exhaust duct 28, that is, through the second exhaust duct 29 communicably connected to the solvent separating unit 17.

FIG. 3A is a plan view. By arranging the solvent separating unit 17 such that the first wall surface 17*a* on which the electrode 25 is arranged forms a lower surface and the second wall surface 17*b* forms an upper surface in the vertical direction, the first exhaust atmosphere 26 containing the solvent 23 is more surely concentrated in an area in the vicinity of the electrode 25 due to own weight of the solvent 23 and hence, the first exhaust atmosphere 26 containing the solvent 23 can be more surely discharged to the outside of the solvent separating unit 17 through the first exhaust duct 28.

According to the first embodiment, the solvent separating apparatus is configured such that the electrode 25 is arranged on one wall surface 17*a* of the solvent separating unit 17 along the flow direction of the flow path 42. Accordingly, also in the case of removing the vaporized solvent 23 contained in the exhaust atmosphere discharged from the heat treatment furnace apparatus 1 which performs heating, an electric field 24 is generated in the inside of the flow path 42. Due to such a constitution, an exhaust atmosphere can be separated into a gas containing the solvent 23 and a gas containing no solvent 23 by inducing the solvent 23 to the electrode 25 side without cooling the exhaust atmosphere. Accordingly, the vaporized solvent 23 difficult in separation or removal from the exhaust atmosphere due to the small mass as it is can efficiently be removed so that the exhaust atmosphere can be purified.

Second Embodiment

Figure 4A:
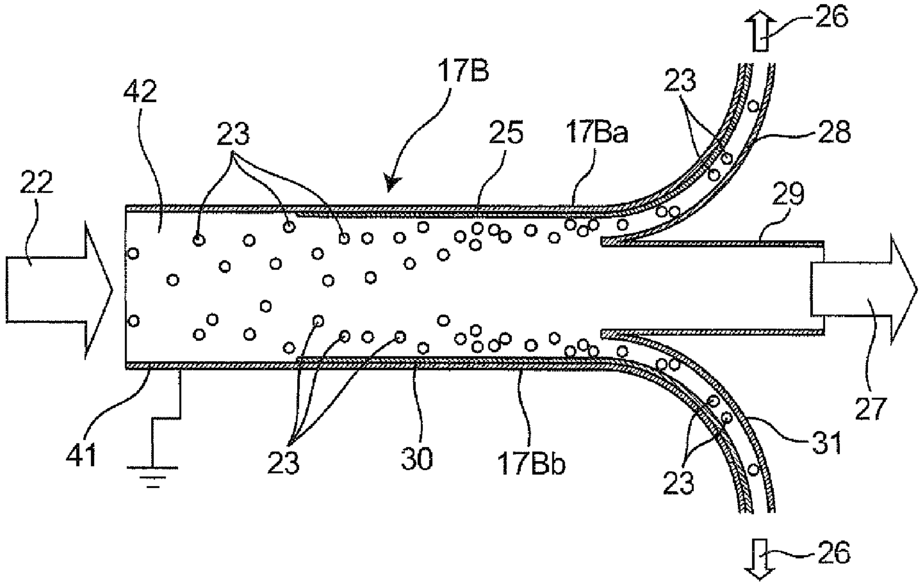
FIG. 4A is a plan view of the solvent separating unit for describing a solvent separating method according to a second embodiment of the present invention.
Figure 4B:
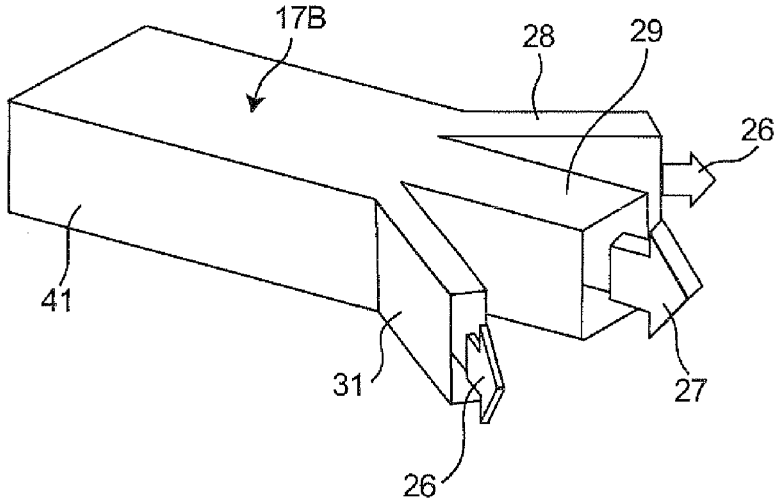
FIG. 4B is a perspective view of the solvent separating unit shown in FIG. 4A.

FIG. 4A and FIG. 4B are explanatory views of a solvent separating method according a second embodiment of the present invention. In the second embodiment, a solvent separating unit 17B is arranged in place of the solvent separating unit 17 in the first embodiment.

In the solvent separating unit 17B, an electrode (first electrode) 25 which applies a negative charge to a solvent 23 having a polarity and contained in an exhaust atmosphere 22 discharged from a heat treatment apparatus 1 is mounted on a first wall surface 17Ba arranged on one side of the solvent separating unit 17B. A second electrode 30 which applies a positive charge to the solvent 23 is mounted on a second wall surface 17Bb arranged on the other side of the solvent separating unit 17B. The electrode 25 and the second electrode 30 are arranged in an extending manner in the direction along which the exhaust atmosphere 22 flows. In the same manner as the first embodiment, a first exhaust duct 28 is provided to an outlet side of the solvent separating unit 17B along the first wall surface 17Ba so that, as described later, an exhaust atmosphere 26 containing the solvent 23 can be discharged to the outside of the solvent separating unit 17B. Further, a second exhaust duct 29 is provided to the center of the solvent separating unit 17B on the outlet side so that a second exhaust atmosphere 27 can be discharged. Still further, a third exhaust duct 31 is provided to the solvent separating unit 17B along a second wall surface 17Bb. Accordingly, as described later, the exhaust atmosphere 26 containing the solvent 23 can be discharged to the outside of the solvent separating unit 17B through the third exhaust duct 31. The outlet side of the solvent separating unit 17 is branched into three ducts consisting of the first exhaust duct 28, the second exhaust duct 29, and the third exhaust duct 31. The first exhaust duct 28 and the third exhaust duct 31 constitute one example of the first exhaust duct 19 shown in FIG. 1, and the second exhaust duct 29 constitutes one example of the second exhaust duct 18 shown in FIG. 1. In this embodiment, as one example, the second exhaust duct 29 is formed on the outlet side of the solvent separating unit 17B with an opening area larger than opening areas of the first exhaust duct 28 and the third exhaust duct 31. The second electrode 30 is formed so as to extend over the second wall surface 17Bb and at least to a branched portion formed on a wall surface of the third exhaust duct 31 which is continuously formed with the second wall surface 17Bb.

As described above, molecules having a polarity such as molecules of water or molecules of ethanol are induced to both a positive charge and a negative charge due to a property of such molecules and hence, such molecules are electrostatically induced to the electrode 25 or 30 arranged closer to the molecules in the flow of the exhaust atmosphere 22. Accordingly, the solvent 23 in the exhaust atmosphere 22 is electrostatically induced and concentrated on an area in the vicinity of the negative electrode 25 and on an area in the vicinity of the second electrode 30 having a positive polarity through a predetermined path length. Then, together with an exhaust atmosphere 26 which contains the solvent 23 in a concentrated manner in the areas in the vicinity of the electrodes 25, 30, the solvent 23 is discharged to the outside of the solvent separating unit 17B through the first exhaust duct 28 and the third exhaust duct 31. On the other hand, a purified second exhaust atmosphere 27 containing no solvent 23 is discharged to the outside of the solvent separating unit 17B through a path different from the first exhaust duct 28 and the third exhaust duct 31, that is, through the second exhaust duct 29 which is arranged at the center of the solvent separating unit 17B and is communicably connected to the solvent separating unit 17B.

In the case of the second embodiment, compared to the first embodiment shown in FIG. 3A and FIG. 3B, the electrodes 25, 30 by which the solvent 23 is electrostatically induced are present in two directions with respect to the flow path 42. Accordingly, assuming that a diameter of a duct and an exhaust flow rate in this embodiment are equal to those of the first embodiment shown in FIG. 3A and FIG. 3B, a path length required to complete the separation of the solvent 23 can be halved in this embodiment.

Third Embodiment

Figure 5A:
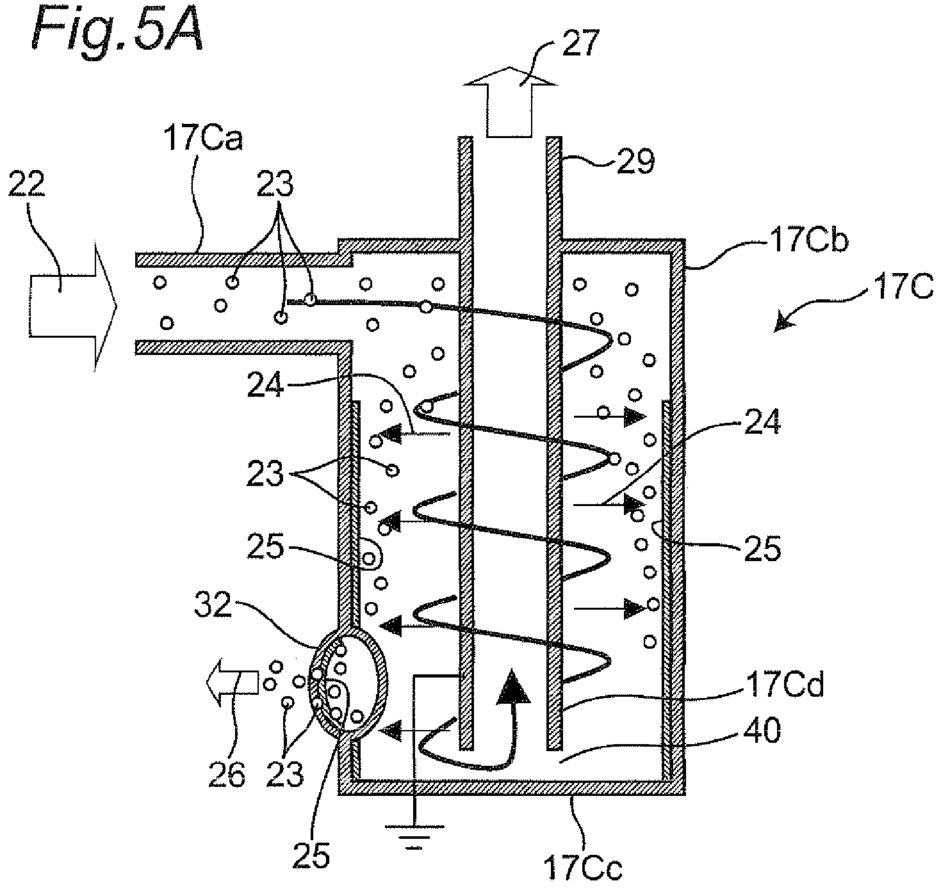
FIG. 5A is a longitudinal cross-sectional view of a solvent separating unit for describing a solvent separating method according to the third embodiment of the present invention.
Figure 5B:
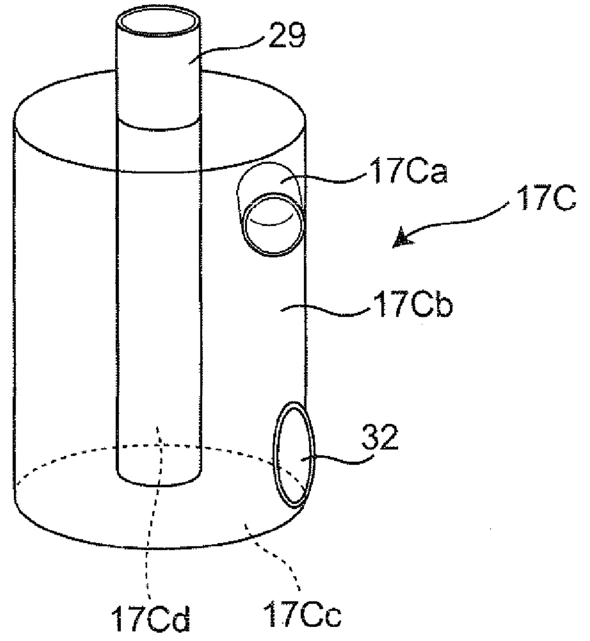
FIG. 5B is a perspective view of the solvent separating unit shown in FIG. 5A.

FIG. 5A and FIG. 5B are explanatory views of a solvent separating method according to a third embodiment of the present invention. In the third embodiment, a cylindrical solvent separating unit 17C which extends in the vertical direction is arranged in place of the solvent separating unit 17 in the first embodiment. The solvent separating unit 17C is configured such that an inlet 17Ca is arranged at an upper end of a vertically extending cylindrical member, and a second exhaust duct 29 is concentrically inserted into and fixed to the vertically extending cylindrical member at the center of the vertically extending cylindrical member along the vertical direction. The second exhaust duct 29 formed of a cylindrical member extends to an area in the vicinity of a lower end surface of the vertically extending cylindrical member while penetrating an upper end surface of the vertically extending cylindrical member. An electrode 25 is arranged on the whole inner periphery of a cylindrically curved side wall surface 17Cb of the solvent separating unit 170 except for an area in the vicinity of the inlet 17Ca, that is, from an area in the vicinity of the center of the side wall surface 17Cb to a lower end of the side wall surface 17Cb. In other words, the electrode 25 is, as described later, provided so as to extend in the direction along which the exhaust atmosphere 22 flows. A gap 40 is ensured between a lower end of the second exhaust duct 29 and a lower end surface 17Cc of the solvent separating unit 170 so that a part of a gas supplied into the inside of the solvent separating unit 17C through the inlet 17Ca flows into the inside of the second exhaust duct 29 through the gap 40 and can be discharged to the outside of the solvent separating unit 170. An exhaust opening portion 32 is formed in a lower end of the curved wall surface 17Cb of the solvent separating unit 17C so that a remaining gas of the gas supplied to the inside of the solvent separating unit 17C can be discharged to the outside of the solvent separating unit 17C. The electrode 25 is also arranged in the inside of the exhaust opening portion 32.

In the solvent separating unit 17C having such a constitution, the exhaust atmosphere 22 containing the solvent 23 is sucked into the inside of the solvent separating unit 17C through the inlet 17Ca formed on an upper end of the solvent separating unit 170 in the vertical direction, and advances to a lower side of the solvent separating unit 17C while spirally rotating along the curved wall surface 17Cb in the solvent separating unit 17C corresponding to a flow rate at the time of being sucked. At this point of time, in a region of the inner wall 17Cb of the solvent separating unit 17C where a negatively charged electrode 25 is provided (preferably, whole peripheral region), an electric field 24 is generated in the direction toward the electrode 25, that is, toward the outside (radial direction) from the center between the electrode 25 and the wall surface 17Cd of the second exhaust duct 29 which is insulated from the electrode 25 and is connected to the ground. Accordingly, the solvent 23 in the exhaust atmosphere 22 advances downward while receiving a force which attracts the solvent 23 to an area in the vicinity of the electrode 25, that is, to an area in the vicinity of an inner wall of the solvent separating unit 17C due to an electrostatic induction. In view of the above, an exhaust opening portion 32 is formed in the inner wall 17Cb of the solvent separating unit 17C on the spiral flow at a position away from the inlet 17Ca by a predetermined path length, and a part of the exhaust atmosphere containing the solvent 23 which is attracted by the area in the vicinity of the inner wall 17Cb on which the electrode 25 is arranged is discharged to the outside of the solvent separating unit 170 through the exhaust opening portion 32 by way of a duct which is communicably connected to the outside of the solvent separating unit 17C. At this point of time, the exhaust atmosphere containing no solvent 23 which flows an area away from an inner wall 170*b* is guided to an opening portion formed on a distal end of the second exhaust duct 29 (a lower end in the vertical direction), elevates upwardly in the second exhaust duct 29 in the vertical direction, and is discharged to the outside of the solvent separating unit 17C from an upper end of the second exhaust duct 29. A first exhaust duct not shown in the drawing is connected to the exhaust opening portion 32. The first exhaust duct constitutes one example of the first exhaust duct 19 shown in FIG. 1, and the second exhaust duct 29 constitutes one example of the second exhaust duct 18 shown in FIG. 1.

In the case of the third embodiment, a region where an electric field exerts its influences by the electrostatic induction can be formed into a vortex shape in the solvent separating unit 17C and hence, compared to the first embodiment shown in FIG. 3A and FIG. 3B and the second embodiment shown in FIG. 4A and FIG. 4B, the size of the solvent separating unit 17C can be reduced as a whole.

Fourth Embodiment

Figure 6:
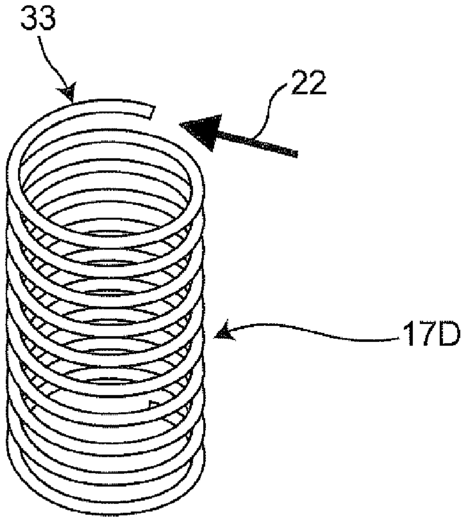
FIG. 6 is a perspective view of a solvent separating unit for describing a solvent separating method according to a fourth embodiment of the present invention.
Figure 7:
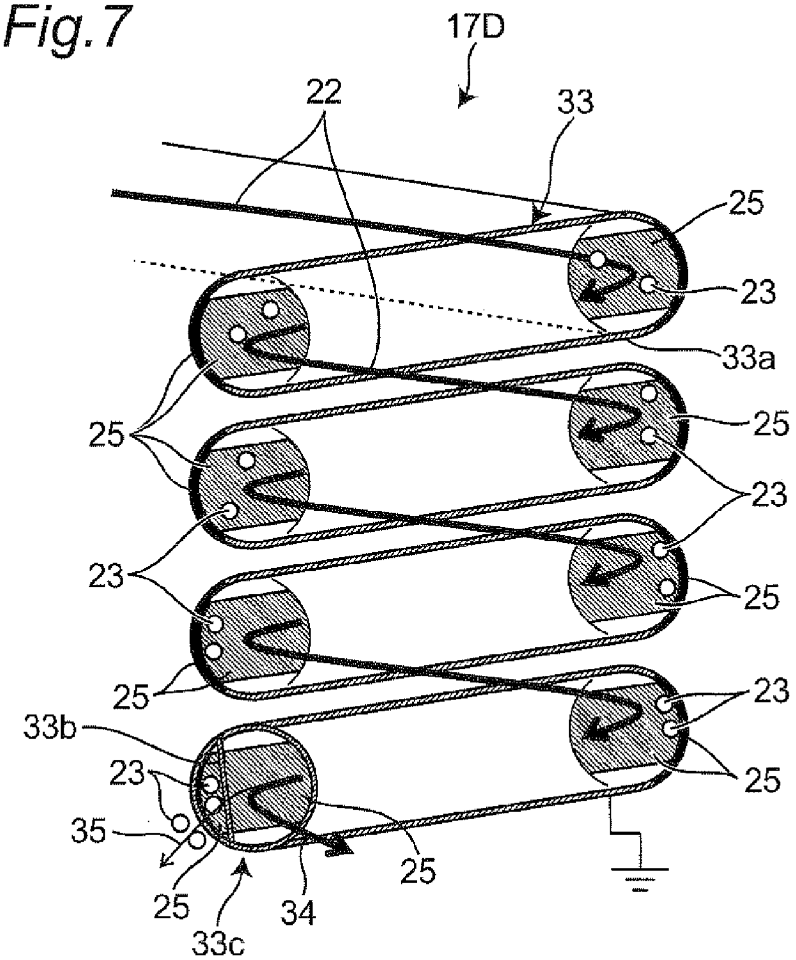
FIG. 7 is a longitudinal cross-sectional view for describing the constitution of the solvent separating unit shown in FIG. 6.

FIG. 6 is an explanatory view for describing a solvent separating method according to a fourth embodiment of the present invention. In the fourth embodiment, a solvent separating unit 17D is arranged in place of the solvent separating unit 17 in the first embodiment. The solvent separating unit 17D is configured such that a cylindrical pipe 33 is arranged in a spiral shape. An electrode 25 is arranged in the vicinity of the center on an outer side of an inner wall 33*a* of the cylindrical pipe 33 formed into a spiral shape. The electrode 25 is electrically insulated from the cylindrical pipe 33, and is continuously arranged in the direction along which the flow of gas in the cylindrical pipe 33 advances (arranged so as to extend in the direction along which the gas flows), and the cylindrical pipe is connected to the ground. FIG. 7 is a longitudinal cross-sectional view of the solvent separating unit 17D in FIG. 6. In the inside of the cylindrical pipe 33 formed into a coil shape, an electric field is generated between the electrode 25 and the inner wall 33*a* of the cylindrical pipe 33 which is insulated from the electrode 25 and is connected to the ground. Accordingly, while an exhaust atmosphere 22 introduced into the inside of the cylindrical pipe 33 spirally flows in the inside of the cylindrical pipe 33, the solvent 23 is attracted to an electrode 25 side due to an electrostatic induction generated by the electric field. At an outlet 33*c* of the cylindrical pipe which is positioned remote from an upper end of the cylindrical pipe by a predetermined path length, the cylindrical pipe is branched by a branch wall 33*b* into a first exhaust duct 34 through which an exhaust atmosphere containing no solvent is discharged and a second exhaust duct 35 through which an exhaust atmosphere containing a solvent attracted by the electrode 25 is discharged. The exhaust atmosphere containing no solvent and the exhaust atmosphere containing a solvent are discharged to the outside of the unit through the first exhaust duct 34 and the second exhaust duct 35, respectively.

Also in the case of the fourth embodiment, a region where an electric field exerts its influence by electrostatic induction can be formed into a vortex shape in the cylindrical pipe 33 having a coil shape. Accordingly, compared to the first embodiment shown in FIG. 3A and FIG. 3B and the second embodiment shown in FIG. 4A and FIG. 4B, the size of the solvent separating unit 17D can be reduced.

(Modification)

In all cases shown in FIG. 3A and FIG. 3B, FIG. 4A and FIG. 4B, FIG. 5A and FIG. 5B, and FIG. 6 and FIG. 7, the heat insulation working may be performed such that a heat insulating material 44 is arranged so as to cover the respective outsides of the solvent separating units 17, 17B, 17C, 17D and the exhaust ducts 28, 29, 31, 34, 35. When a temperature of the exhaust atmosphere 22, 26, 27 which flows within a range from the solvent separating unit 17, 17B, 17C, 17D to the exhaust ducts 28, 29, 31, 34, 35 is equal to an in-furnace temperature of the heat treatment apparatus 1 due to such heat insulation, the solvent 23 is discharged to the outsides of the solvent separating units 17, 17B, 17C, 17D while keeping a vaporized state. Even when a temperature of each of the exhaust atmospheres 22, 26, 27 which flows within a range from the solvent separating units 17, 17B, 17C, 17D to the exhaust ducts 28, 29, 31, 34, 35 becomes lower than an in-furnace temperature in the heat treatment apparatus 1, a part of the solvent is collected in a condensate state in the vicinity of the electrodes 25, 30 to which the solvent is attracted due to a charge. As a result, only the exhaust atmosphere 27 containing no solvent 23 is discharged to the ducts 29, 34 through which the purified atmosphere is discharged.

Fifth Embodiment

Figure 8:
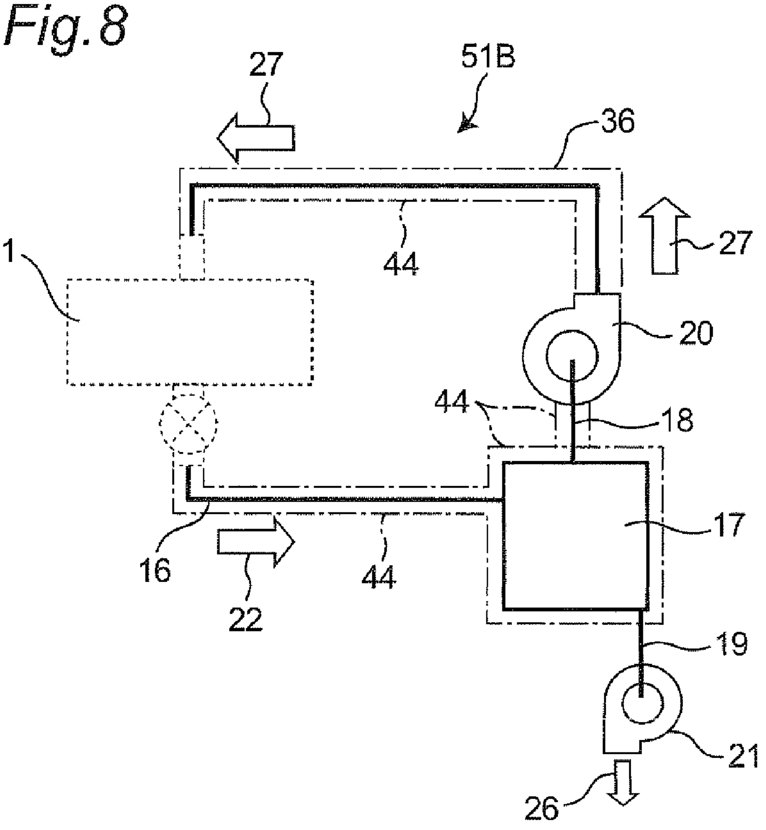
FIG. 8 is an explanatory view of a solvent separating apparatus including a solvent separating unit according to a fifth embodiment of the present invention.

FIG. 8 shows a solvent separating apparatus 51B according to a fifth embodiment of the present invention. The solvent separating apparatus 51B is connected to a heat treatment apparatus 1. The solvent separating apparatus 51B includes: an exhaust duct 16; a solvent separating unit 17; a first exhaust duct 19; a second exhaust duct 18; a first exhaust blower 21; a second exhaust blower 20; and a circulation duct 36. The fifth embodiment exemplifies the configuration where a purified exhaust atmosphere (second exhaust atmosphere) 27 is returned to the inside of the heat treatment apparatus 1 by circulation through the circulation duct 36 instead of discharging the purified exhaust atmosphere (second exhaust atmosphere) 27 to the outside of the heat treatment apparatus 1. Accordingly, the purified exhaust atmosphere 27 from which the solvent 23 is removed is discharged to a second exhaust blower 20 side which is communicably connected to a downstream side of the circulation path, and is introduced into the inside of the heat treatment apparatus 1 again by the second exhaust blower 20 through the circulation duct 36.

In this manner, in the case where the purified exhaust atmosphere discharged from the solvent separating unit 17 is returned to the inside of the heat treatment apparatus 1 by circulation through the circulation duct 36 instead of discharging the purified exhaust atmosphere to the outside of the heat treatment apparatus 1, the purified exhaust atmosphere is not positively cooled on a circulation path. Accordingly, the heat insulation may be performed by arranging a heat insulating material or the like over the whole circulation path. That is, the heat insulation may be performed by arranging a heat insulating material 44 so as to cover outer sides of the solvent separating unit 17, the exhaust ducts 16, 18, and the circulation duct 36. By performing the heat insulation in this manner, energy for increasing a temperature of an exhaust atmosphere to an in-furnace temperature again becomes almost unnecessary in returning the exhaust atmosphere to the heat treatment apparatus 1 by circulation and hence, a consumption energy of a furnace can be suppressed.

In the case where an exhaust atmosphere contains a substance other than a vaporized solvent, for example, in the case where the exhaust atmosphere contains oil mist or a dust, by arranging a centrifugal separation unit, an electrostatic separation unit, or the like in a step preceding to step performed by the solvent separating apparatus 51B or in a step succeeding to the step performed by the solvent separating apparatus 51B, it is possible to prevent a foreign material from entering the heat treatment apparatus 1. Here, the electrostatic separation unit separates oil mist or dust from an exhaust atmosphere by electrostatic induction by forcibly charging the oil mist or the dust using a corona discharge or the like. In such a case, it is necessary to select a separation method depending on a size of foreign material to be separated or removed.

Figure 9:
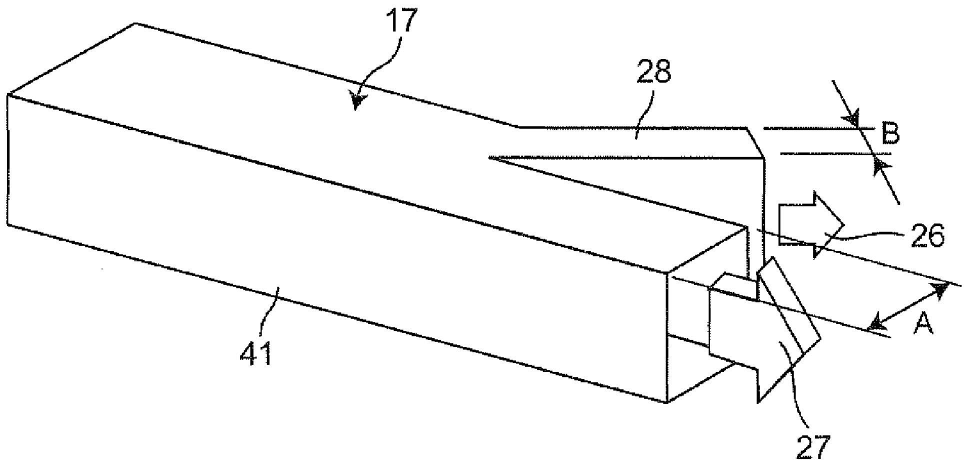
FIG. 9 is an explanatory view for describing a width of an exhaust duct.
Figure 10:
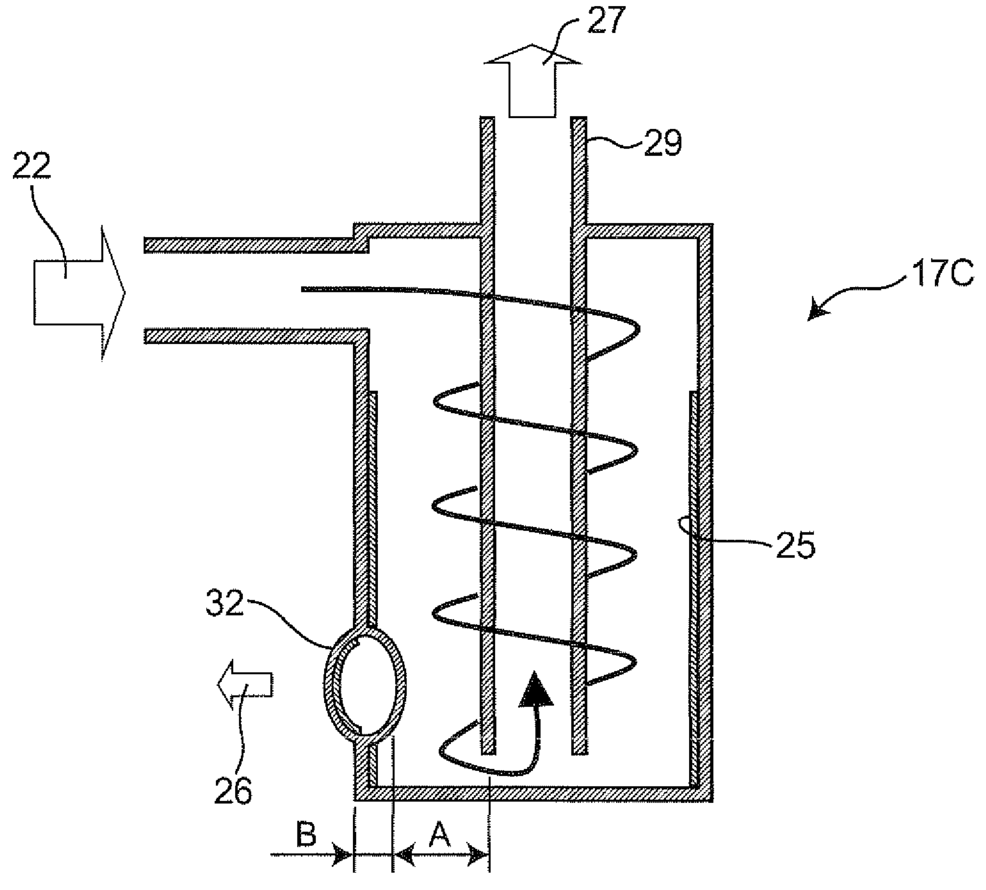
FIG. 10 is an explanatory view of widths of paths through which an exhaust passes.

In discharging a separated exhaust atmosphere containing a solvent, by increasing a ratio of a discharge amount of an exhaust atmosphere containing no solvent as much as possible, an amount of heat of the circulating exhaust atmosphere generated by a heater in a furnace of the heat treatment apparatus 1 can be reduced. FIG. 9 is an explanatory view for describing a width of an opening through which the exhaust is discharged in the first embodiment shown in FIG. 3A and FIG. 3B. FIG. 9 shows a width A of an opening of the solvent separating unit 17 through which an exhaust atmosphere containing no solvent is discharged, and a width B of an opening of the solvent separating unit 17 through which an exhaust atmosphere containing a solvent is discharged. FIG. 10 is an explanatory view of widths of paths through which the exhaust passes in the third embodiment shown in FIG. 5A and FIG. 5B. FIG. 10 shows a width A of the path in the solvent separating unit 17C through which an exhaust atmosphere containing no solvent passes and a width B of the path in the solvent separating unit 17C through which an exhaust atmosphere containing a solvent passes. A ratio between the width A and the width B varies depending on a concentration of solvent. For example, when the ratio between the width A and the width B is 8 to 2 (A:B=8:2), 20% of the exhaust atmosphere is discharged to the outside of the solvent separating unit together with the solvent.

Sixth Embodiment

Figure 11:
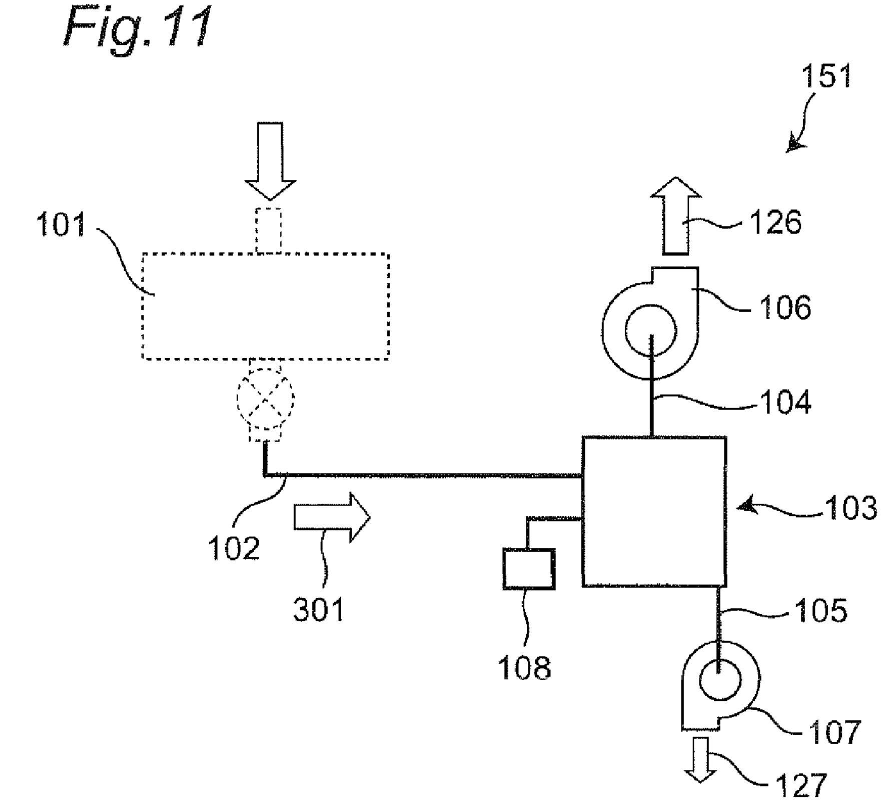
FIG. 11 is a schematic view of the solvent separating apparatus including the solvent separating unit according to a sixth embodiment of the present invention.

A sixth embodiment of the present invention is described by reference to FIG. 11, FIG. 2, and FIG. 12A to FIG. 13. FIG. 11 is a schematic view of a solvent separating apparatus (heat treatment solvent separating apparatus) 151 including a solvent separating unit 103 where a solvent separating method according to the sixth embodiment of the present invention can be performed. The solvent separating apparatus 151 is connected to a heat treatment apparatus 101 which constitutes one example of an exhaust generating apparatus. The solvent separating apparatus 151 includes: an exhaust duct 102; a solvent separating unit 103; a second exhaust duct 104; a first exhaust duct 105; a second exhaust blower 106; a first exhaust blower 107; and a voltage applying apparatus 108.

The heat treatment apparatus 101 is formed of a furnace where a heat treatment is performed such as a baking furnace, a drying furnace, a curing furnace, or a reflow furnace, for example. In the heat treatment, heating is performed corresponding to various materials or members which are objects to be heated. A solvent is vaporized in an atmosphere (atmospheric gas) in the inside of the heat treatment apparatus 101 by such heating. Apart of the atmospheric gas containing the vaporized solvent in the inside of the heat treatment apparatus is introduced into the exhaust duct 102 arranged in a communicably connected manner with the heat treatment apparatus 101.

The solvent separating unit 103 is connected to a downstream side of the exhaust duct 102. An exhaust atmospheric gas 301 is fed to the inside of the solvent separating unit 103 from the heat treatment apparatus 101 through the exhaust duct 102. As described in detail later, gas molecules of the vaporized solvent 302 having a polarity in the exhaust atmospheric gas 301 are separated from gas molecules of gases other than the solvent in the exhaust atmospheric gas 301 due to the electrostatic induction generated by an electric field generated by the voltage applying apparatus 108. As a result, the exhaust atmospheric gas is separated into an exhaust atmospheric gas 126 containing no solvent 302 and an exhaust atmospheric gas 127 containing the solvent 302 so that a concentration of the solvent becomes non-uniform in the exhaust atmospheric gas. In this embodiment, the electrostatic induction means a phenomenon where a positively charged substance is attracted by a negative charge, and a negatively charged substance is attracted by a positive charge.

The exhaust atmospheric gas 126 containing no solvent and the exhaust atmospheric gas 127 containing the solvent which are separated from each other in the solvent separating unit 103 in this manner are respectively introduced into the second exhaust duct 104 and the first exhaust duct 105 which are formed of separate members and are connected to the solvent separating unit 103. The exhaust atmospheric gas 126 containing no solvent is discharged to a second exhaust blower 106 side through the second exhaust duct 104, and is discharged to the outside of the solvent separating unit 103 by the second exhaust blower 106. On the other hand, the exhaust atmospheric gas 127 containing the solvent is discharged to the outside of the solvent separating unit 103 by the first exhaust blower 107 through the first exhaust duct 105 in a system different from the second exhaust duct 104. In such a case, a negative pressure on a suction side of the first exhaust blower 107 is set equal to a negative pressure on a suction side of the second exhaust blower 106. The negative pressure on the suction side of the first exhaust blower 107 and the negative pressure on the suction side of the second exhaust blower 106 are set equal to each other for allowing two separated exhaust atmospheric gases 126, 127 to be smoothly discharged from the second exhaust blower 106 and the first exhaust blower 107 respectively.

FIG. 2 shows the molecular structure of water. As shown in FIG. 2, water has polarities due to the molecular structure of water and the electronegativity of atoms which constitute the molecular structure of water and hence, water is electrically biased. In the same manner, there exist other solvents such as ethanol which are electrically biased. A substance which is generally used as a solvent has a polarity due to the molecular structure thereof as described above, so that the substance has a property which easily dissolves other substances having other polarity and hence, the substance is used as a solvent. When molecules of such a substance having a polarity are placed in an electric field, irrespective of whether an electrode which generates an electric field is a positive electrode or a negative electrode, the molecules are attracted to the electrode due to the electrostatic induction. This is because, due to the electrostatic induction, when an electrode is positively charged, a side of a water molecule which is negatively biased is attracted to the electrode, while when an electrode is negatively charged, a side of the water molecule which is positively biased is attracted to the electrode.

Figure 12A:
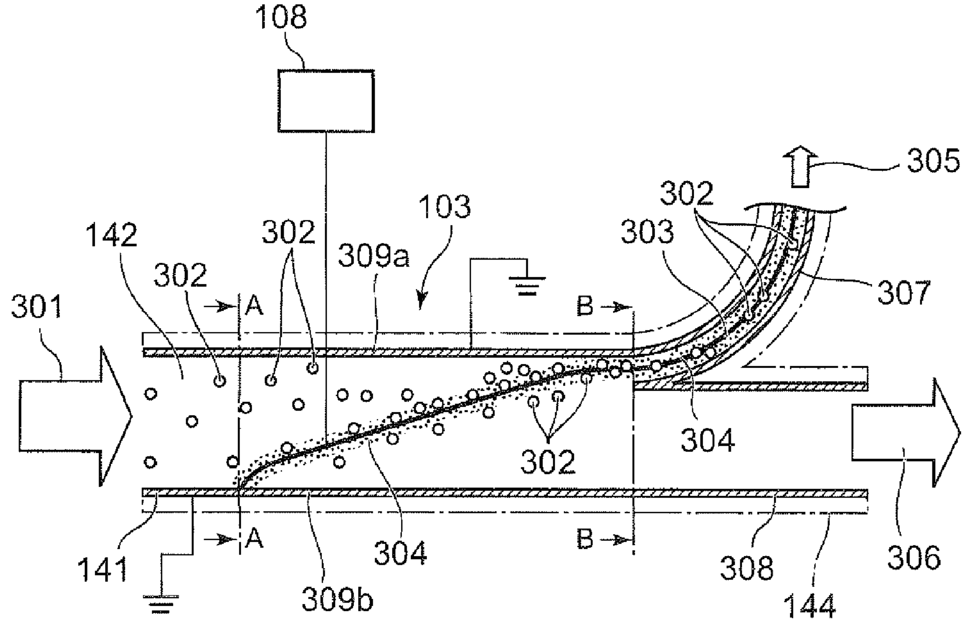
FIG. 12A is a plan view of a solvent separating apparatus for describing a solvent separating unit according to the sixth embodiment of the present invention.
Figure 12B:
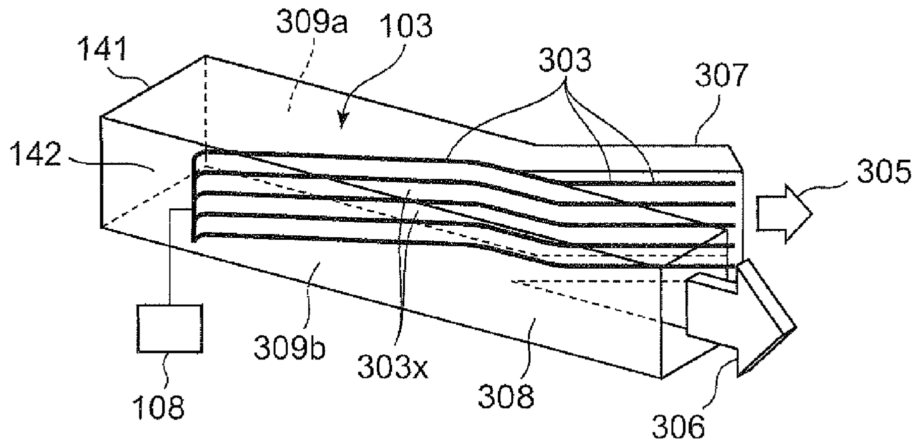
FIG. 12B is a perspective view of the solvent separating unit shown in FIG. 12A.

FIG. 12A and FIG. 12B are views showing the solvent separating unit 103 according to the sixth embodiment. Electrodes 303 are arranged so as to intersect with the exhaust atmospheric gas 301 containing a solvent 302 having a polarity. The exhaust atmospheric gas 301 is contained in an exhaust atmosphere 22 discharged from the heat treatment apparatus 101 and is supplied to the solvent separating unit 103. A function of separating the solvent 302 from the exhaust atmospheric gas 301 in the inside of the solvent separating unit 103 is described hereinafter. The solvent separating unit 103 includes: a quadrangular cylindrical member 141; a plurality of linear electrodes 303; a voltage applying apparatus 108; a second exhaust duct 308; and a first exhaust duct 307.

Firstly, for example, a flow path 142 having a quadrangular columnar shape is formed in the quadrangular cylindrical member 141 of the solvent separating unit 103. The exhaust atmospheric gas 301 flows through the flow path 142 in the fixed direction. Between a first wall surface (inner wall surface, for example) 309*a* of the quadrangular cylindrical member 141 and a second wall surface (inner wall surface, for example) 309*b* which is arranged on a side opposite to the first wall surface 309*a*, the plurality of electrodes 303 are arranged in a spaced apart manner from the respective wall surfaces 309*a*, 309*b* (including upper and lower wall surfaces 309*c*, 309*d*). The plurality of electrodes 303 are arranged so as to extend linearly along the direction which intersects with the direction along which the exhaust atmospheric gas 301 flows, and a slit-like gap 303*x* is formed between two neighboring electrodes 303. The gap 303*x* is an opening through which the exhaust atmospheric gas 301 passes. The electrodes 303 are connected to the voltage applying apparatus 108 so that a voltage can be applied to the electrodes 303 by the voltage applying apparatus 108. A magnitude of voltage to be applied is appropriately decided by taking into account a concentration of solvent, an arrangement length of the electrode, a flow rate of the exhaust atmospheric gas 301, or a size of the flow path 142. Further, the first wall surface 309*a* and the second wall surface 309*b* are insulated from the electrodes 303 and are connected to a ground. When a voltage is applied to the electrodes 303 by the voltage applying apparatus 108, a potential difference is generated between the electrodes 303 and the wall surfaces 309*a*, 309*b* so that an electric field 304 is generated in the inside of the solvent separating unit 103. A solvent (particles of the solvent) 302 having a polarity is induced by the electrodes 303 through a predetermined path length. Thereafter, a first exhaust atmospheric gas 305 containing the solvent 302 which is concentrated in an area in the vicinity of the electrodes 303 is discharged to the outside of the solvent separating unit 103 through the first exhaust duct 307. On the other hand, a purified second exhaust atmospheric gas 306 containing no solvent 302 is discharged to the outside of the solvent separating unit 103 through a path different from the first exhaust duct 307, that is, through the second exhaust duct 308 communicably connected to the solvent separating unit 103.

Figure 13:
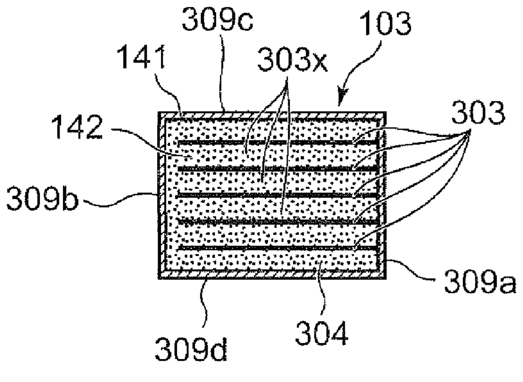
FIG. 13 is a cross-sectional view of a flow path after the integration processing is applied in a state where cross sections of a large number of flow paths of the solvent separating unit according to the sixth embodiment of the present invention are overlapped with each other.

FIG. 13 is a view obtained by overlapping cross sections orthogonal to the flow of the exhaust atmospheric gas 301 which are taken at predetermined intervals from a cross section A-A to a cross section B-B in the solvent separating unit 103 shown in FIG. 12A and FIG. 12B. That is, a large number of electrodes 303 are arranged such that all cross sections in the direction orthogonal to the direction that the gas (exhaust atmospheric gas 301) flows fall within the range of the electric field by integrating electric fields 304 generated by applying a voltage to the electrodes 303 on cross sections in the direction orthogonal to the direction that a gas flows within a range from a position of a leading end of the flow path before branching (position taken along the cross section A-A) to a position where the flow path is branched (position of the outlet) (position taken along the cross section B-B). Due to such a constitution, the electric fields 304 which are generated by applying a voltage to the electrodes 303 by the voltage applying apparatus 108 (a region hutched with fine dots in FIG. 13) extend over the whole width as well as over the whole height of the flow path 142. Accordingly, the solvent (particles of solvent) 302 having a polarity and contained in the exhaust atmospheric gas 301 which flows in the solvent separating unit 103 never fails to receive an induction effect of the electric field 304 in the course of flowing through the flow path 142 in the solvent separating unit 103 and is attracted to the electrodes 303.

The first exhaust duct 307 is provided to a portion of the solvent separating unit 103 on an outlet side of the flow path 142 along the first wall surface 309*a*. As described later, the first exhaust atmospheric gas 305 which contains the solvent 302 concentrated in the vicinity of the electrode 303 can be discharged to the outside of the solvent separating unit 103 through the first exhaust duct 307. The second exhaust duct 308 is provided to the solvent separating unit 103 along the second wall surface 309*b*. As described later, the remaining exhaust atmosphere, that is, the second exhaust atmospheric gas 306 can be discharged to the outside of the solvent separating unit 103 through the second exhaust duct 308. The solvent separating unit 103 is configured such that the outlet side of the solvent separating unit 103 is branched into the second exhaust duct 308 and the first exhaust duct 307. The second exhaust duct 308 constitutes one example of the second exhaust duct 104 shown in FIG. 11, and the first exhaust duct 307 constitutes one example of the first exhaust duct 105 shown in FIG. 11. In this embodiment, as one example, the second exhaust duct 308 is formed on the outlet side of the solvent separating unit 103 with an opening area larger than an opening area of the first exhaust duct 307. The electrodes 303 are formed such that the electrodes 303 intersect with the flow path 142, and extend from the second wall surface 309*b* over the first wall surface 309*a* and reach at least a branched portion on a wall surface of the first exhaust duct 307 which is contiguously formed from the first wall surface 309*a*.

Figure 12C:
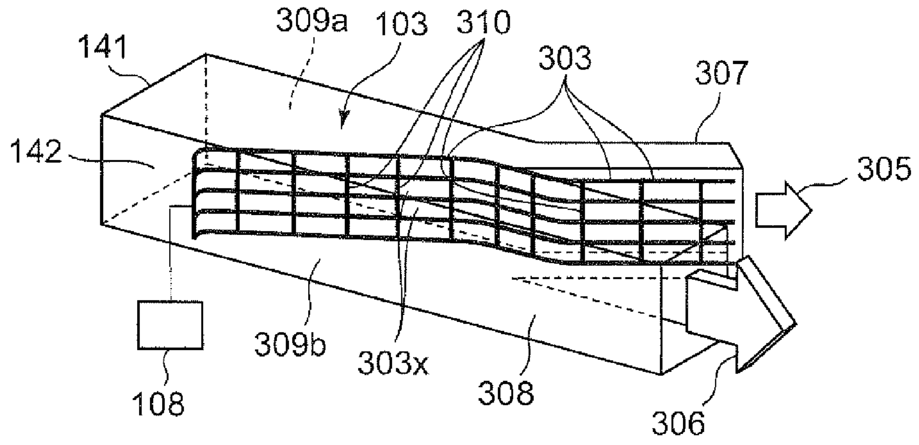
FIG. 12C is a perspective view of a case where a connecting portion is added to the solvent separating unit shown in FIG. 12A.

FIG. 12A is a plan view. By arranging the solvent separating unit 103 such that the first wall surface 309*a* forms a lower surface and the second wall surface 309*b* forms an upper surface in the vertical direction, the first exhaust atmospheric gas 305 containing the solvent 302 more surely flows along the electrodes 303 due to own weight of the solvent 302 and hence, the first exhaust atmospheric gas 305 containing the solvent 302 can be more surely discharged to the outside of the solvent separating unit 103 through the first exhaust duct 307. As shown in FIG. 12C, the plurality of electrodes 303 may be configured such that the electrodes 303 are surely positioned in a flow path in the inside of the solvent separating unit 103 by fixing the electrodes 303 by connecting portions 310. The connecting portion 310 may be formed as a part of the electrode by forming the connecting portion 310 using a raw material substantially equal to a material for forming the electrode 303.

According to the sixth embodiment, the solvent separating apparatus is configured as follows. The electrodes 303 are arranged along the flow direction of the flow path 142 such that the electrodes 303 intersect with the flow path 142 while extending from the wall surface 309*a* of the solvent separating unit 103 to the wall surface 309*b* which is arranged on a side opposite to the wall surface 309*a*. Accordingly, also in the case where the vaporized solvent 302 contained in the exhaust atmospheric gas discharged from the heat treatment apparatus 101 which performs heating is removed, an electric field 304 is generated in the inside of the flow path 142.

Due to such a constitution, in the removal of a solvent from an exhaust atmospheric gas 301 containing a solvent 302 vaporized by heat discharged from the heat treatment apparatus 101, the exhaust atmospheric gas 301 can be purified by removing the solvent 302 in a gaseous state without liquefying the solvent 302 using energy for cooling. That is, exhaust atmospheric gas can be separated into a gas containing the solvent 302 and a gas containing no solvent 302 by inducing the solvent 302 in the exhaust atmospheric gas 301 to the electrode 303 side without cooling the exhaust atmospheric gas 301. Accordingly, the exhaust atmospheric gas can be purified by efficiently removing the vaporized solvent 302 with an extremely small mass which cannot be separated or removed from the exhaust atmospheric gas without applying any process.

Seventh Embodiment

Figure 14A:
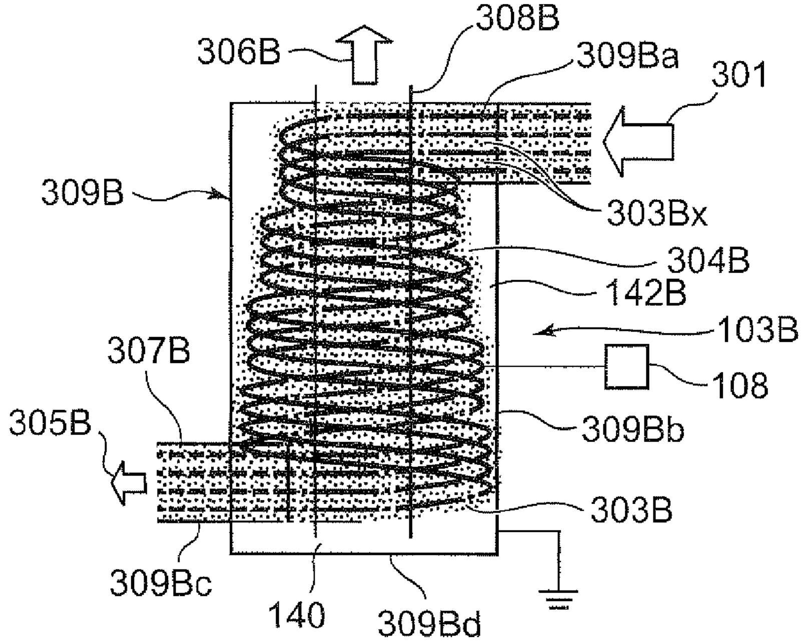
FIG. 14A is a side view of a solvent separating unit according to a seventh embodiment of the present invention.
Figure 14B:
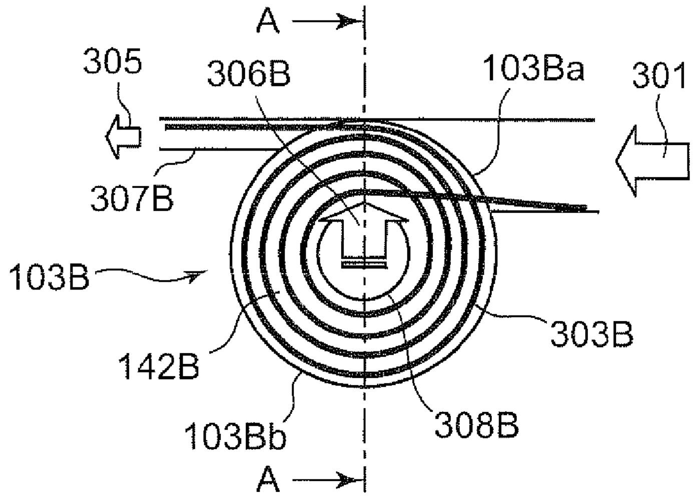
FIG. 14B is a plan view of the solvent separating unit according to the seventh embodiment of the present invention.

A seventh embodiment of the present invention is described by reference to FIG. 14A, FIG. 14B, and FIG. 15. In the seventh embodiment, a solvent separating unit 103E is arranged in place of the solvent separating unit 103 in the sixth embodiment. The constitution of a solvent separating apparatus according to the seventh embodiment of the present invention is substantially equal to the constitution of the solvent separating apparatus 151 according to the sixth embodiment shown in FIG. 11 except for the solvent separating unit 103B which is arranged in place of the solvent separating unit 103. FIG. 14A is a side view of the solvent separating unit 103B according to the seventh embodiment. FIG. 14B is a plan view of the solvent separating unit 103B according to the seventh embodiment.

In the seventh embodiment, a vertically elongated cylindrical solvent separating unit 103B is arranged in place of the solvent separating unit 103 in the sixth embodiment. The solvent separating unit 103B is configured such that an inlet 309Ba is arranged at an upper end of a vertically extending cylindrical member 309B, and a second exhaust duct 308B is concentrically inserted into and fixed to the vertically extending cylindrical member 309B at the center of the vertically extending cylindrical member 309B along the vertical direction. The second exhaust duct 308B formed of a cylindrical member extends to an area in the vicinity of a lower end surface of the vertically extending cylindrical member while penetrating an upper end surface of the vertically extending cylindrical member. In the inside of the solvent separating unit 103B, a plurality of linearly extending electrodes 303B are arranged in a spirally wound manner from an area in the vicinity of the inlet 309Ba to an outlet 309Bc while maintaining a gap so as to prevent the electrodes 303B from being in contact with the side wall surface 309Bb. A slit-like gap 303Bx is formed between two neighboring electrodes 303B. The slit-like gap 303Bx is an opening through which the exhaust atmospheric gas 301 passes. As one example, the electrode 303B is formed into a spiral shape where a diameter of the electrode 303B is gradually increased as the electrode 303B advances to a lower end from an upper end. In other words, as described later, the electrode 303B is arranged so as to extend along the flow direction of the exhaust atmospheric gas 301. The exhaust atmospheric gas 301 flows from the upper end to the lower end of the cylindrical member 309B, in other words, from the inlet 309Ba to the outlet 309Bc of the cylindrical member 309B, while circling around the second exhaust duct 308B. A gap 140 is ensured between a lower end of the second exhaust duct 308B and a lower end surface 309Bd of the solvent separating unit 103B so that a part of a gas supplied into the inside of the solvent separating unit 103B (second exhaust atmospheric gas 306B containing no solvent 302) through the inlet 309Ba flows into the inside of the second exhaust duct 308E through the gap 140 and is discharged to the outside of the solvent separating unit 103B. A first exhaust duct 307B is mounted on an exhaust outlet 309Bc at a lower end of the curved wall surface 309Bb of the solvent separating unit 103E so that a remaining gas of the gas supplied to the inside of the solvent separating unit 103B (first exhaust atmospheric gas 305B containing a solvent 302) can be discharged to the outside of the solvent separating unit 103B. The electrode 303B is also arranged in the inside of the exhaust outlet 309Bc and the first exhaust duct 307B.

In the solvent separating unit 103B having such a constitution, the exhaust atmospheric gas 301 containing the solvent 302 is sucked into the inside of the solvent separating unit 103B through the inlet 309Ba formed on an upper end of the solvent separating unit 103B in the vertical direction, and advances to a lower side of the solvent separating unit 103B while spirally rotating along the curved wall surface 309Bb in the solvent separating unit 103B corresponding to a flow rate at the time of being sucked. The electrodes 303B are arranged in the inside of the solvent separating unit 103B in such a manner that the electrodes 303B have a spiral shape where a radius of spiral is gradually increased as the electrodes 303B advance downward, and is inserted into the first exhaust duct 307B. The radius of the electrode 303B is gradually increased as the electrodes 303B advance downward and hence, the electrode 303B and the sucked exhaust atmospheric gas 301 intersects with each other when the exhaust atmospheric gas 301 advances in a spiral manner. The electrode 303B is connected to a voltage applying apparatus 108. A wall surface 309Bb of the solvent separating unit 1033 is insulated from the electrodes 303B, and is connected to the ground. When voltages are applied to the electrode 3033 by the voltage applying apparatus 108, an electric field 3043 is generated between the electrodes 303B and the wall surface 3093*b*. The exhaust atmospheric gas 301 advances in a state where the solvent 302 in the exhaust atmospheric gas 301 receives a force so that the solvent 302 is attracted to an area in the vicinity of the electrodes 303B due to the electrostatic induction. The exhaust atmospheric gas 301 is guided to the first exhaust duct 307B while maintaining a state where the solvent 302 is induced by the electrodes 303B, and is discharged to the outside of the solvent separating unit 103B. On the other hand, the exhaust atmospheric gas 301 which contains no solvent 302 due to the induction of the solvent 302 is guided to a gap 140 of the second exhaust duct 308B, and is discharged to the outside of the solvent separating unit 103B. The first exhaust duct 307B constitutes one example of the first exhaust duct 105 shown in FIG. 11, and the second exhaust duct 308B constitutes one example of the second exhaust duct 104 in FIG. 11.

Figure 15:
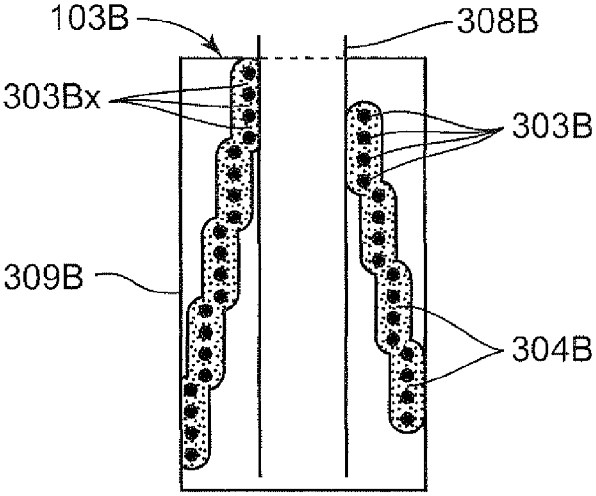
FIG. 15 is a cross-sectional view of a flow path after the integration processing is applied in a state where cross sections of a large number of flow paths of the solvent separating unit according to the seventh embodiment of the present invention are overlapped with each other.

FIG. 15 shows a cross section of the solvent separating unit 103B shown in FIG. 14A and FIG. 14B taken along a line A-A. In the seventh embodiment, the electrode 303B is arranged such that an electric field 304B generated when a voltage is applied to the electrode 303B is divided into an electric field in a region on an inlet 309Ba side and an electric field in a region on the outlet 309Bc and the lower end surface 309Bd side in the solvent separating unit 103B. Due to such a constitution, the solvent 302 having a polarity and contained in the exhaust atmospheric gas 301 which flows into the solvent separating unit 103E never fails to receive an induction effect due to the electric field 3043 in the process that the solvent 302 flows through the flow path 142B in the solvent separating unit 103B so that the solvent 302 is attracted to the electrode 3038.

According to the seventh embodiment, it is possible to also acquire advantageous effects of the sixth embodiment. Further, in the seventh embodiment, a region where an electric field exerts its influence by electrostatic induction can be formed into a vortex shape in the solvent separating unit 103B and hence, compared to the sixth embodiment, a size of the solvent separating unit 1033 can be reduced as a whole.

Eighth Embodiment

Figure 16A:
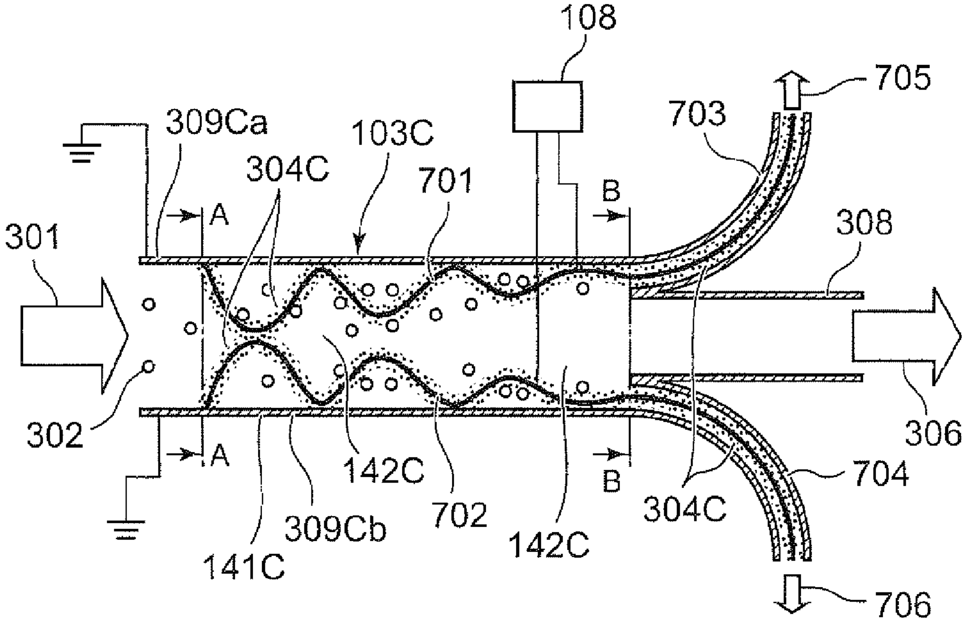
FIG. 16A is an explanatory view of a solvent separating unit according to an eighth embodiment of the present invention.
Figure 16B:
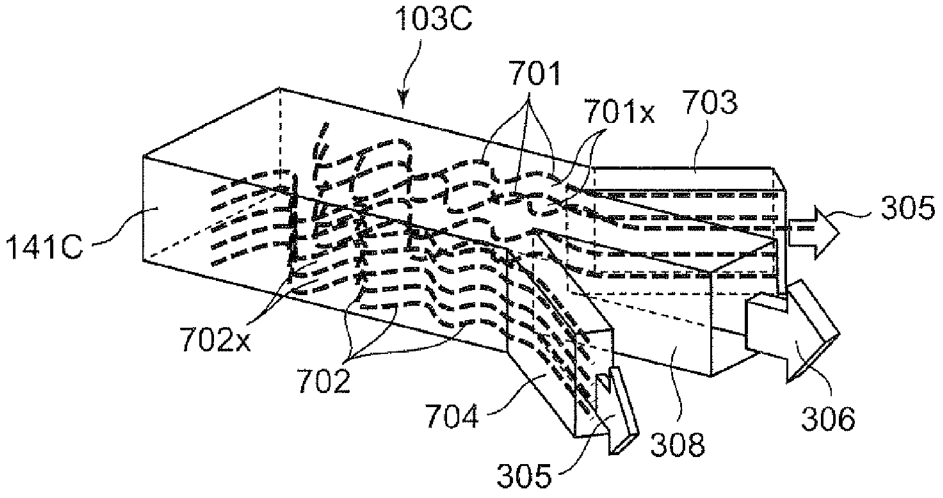
FIG. 16B is an explanatory view of the solvent separating unit according to the eighth embodiment of the present invention.

An eighth embodiment of the present invention is described by reference to FIG. 16A, FIG. 16B, and FIG. 17. The constitution in the eighth embodiment of the present invention is equal to the constitution in the sixth embodiment shown in FIG. 11. FIG. 16A and FIG. 16B are explanatory views of a solvent separating unit according to the eighth embodiment. In the eighth embodiment, a solvent separating unit 103C is arranged in place of the solvent separating unit 103 in the sixth embodiment.

In the same manner as the sixth embodiment, a first exhaust duct 703 is provided to the solvent separating unit 103C on an outlet side of the quadrangular cylindrical member 1410 along a first wall surface 309Ca so that, as described later, the exhaust atmospheric gas 305 containing the solvent 23 can be discharged to the outside of the solvent separating unit 103C. Further, a second exhaust duct 308 is provided to the center of the quadrangular cylindrical member 141C on the outlet side so that the second exhaust atmospheric gas 306 can be discharged to the outside of the solvent separating unit 103C. Still further, another third exhaust duct 704 is provided to the solvent separating unit 103C along the second wall surface 309Cb so that, as described later, the exhaust atmospheric gas 305 containing the solvent 23 can be discharged to the outside of the solvent separating unit 103C.

Further, a flow path 142C having a quadrangular columnar shape through which the exhaust atmospheric gas 301 flows in the fixed direction can be formed in the inside of the quadrangular cylindrical member 141C. A plurality of first electrodes 701 which extend linearly and are bent in a waveform are arranged such that some portions of the electrodes 701 are brought into contact with one first wall surface (inner wall surface, for example) 309*a* of the quadrangular cylindrical member 1410 and other portions of the electrodes 701 are away from one first wall surface 309*a* of the quadrangular cylindrical member 1410. A slit-like gap 701*x* is formed between two neighboring electrodes 701. The gap 701*x* is an opening through which an exhaust atmospheric gas 301 passes. The first electrodes 701 are arranged such that a size of a wave is gradually decreased toward a downstream portion from an upstream portion where an exhaust atmospheric gas 301 containing the solvent 302 is introduced, and the first electrodes 701 are inserted into the first exhaust duct 703. In the same manner as the plurality of first electrodes 701, a plurality of second electrodes 702 which extend linearly and are bent in a waveform are arranged such that some portions of the electrodes 702 are brought into contact with a second wall surface (inner wall surface, for example) 309*b* of the quadrangular cylindrical member 141C which is arranged on a side opposite to the first wall surface (inner wall surface, for example) 309*a* and other portions of the electrodes 702 are away from the second wall surface 309*b* of the quadrangular cylindrical member 1410. A slit-like gap 702*x* is formed between two neighboring electrodes 702. For facilitating the understanding, the first electrodes 701 and the second electrodes 702 are indicated by chain lines in FIG. 16B. The gap 702*x* is an opening through which an exhaust atmospheric gas 301 passes. The second electrodes 702 are arranged such that a size of a wave is gradually decreased toward a downstream side from an upstream side where an exhaust atmospheric gas 301 containing the solvent 302 is introduced, and the second electrodes 702 are inserted into a third exhaust duct 704. The first electrodes 701 and the second electrodes 702 are connected to a voltage applying apparatus 108, and a positive voltage is applied to the first electrodes 701, and a negative voltage is applied to the second electrodes 702.

The first and second wall surfaces 309Ca, 3090*b* of the solvent separating unit 103C are insulated from the first electrode 701 and the second electrode 702 respectively, and are connected to a ground. When a voltage is applied to the first electrode 701 and the second electrode 702 by the voltage applying apparatus 108, potential differences are generated between the first electrode 701 and the wall surface 3090, between the second electrode 702 and the wall surface 309C, and between the first electrode 701 and the second electrode 702 so that electric fields 3040 are generated in the inside of the solvent separating unit 1030.

A solvent 302 having a polarity is induced by the first electrode 701 and the second electrode 702 through a predetermined path length. Thereafter, a first exhaust atmospheric gas 705 containing the solvent 302 which is concentrated in an area in the vicinity of the first electrode 701 is discharged to the outside of the solvent separating unit 1030 through the first exhaust duct 703. A third exhaust atmospheric gas 706 containing the solvent 302 which is concentrated in an area in the vicinity of the second electrode 702 is discharged to the outside of the solvent separating unit 1030 through the third exhaust duct 704.

On the other hand, a purified second exhaust atmospheric gas 306 containing no solvent 302 is discharged to the outside of the solvent separating unit 103C through a path different from the first exhaust duct 703 and the third exhaust duct 704, that is, through the second exhaust duct 308 communicably connected to the solvent separating unit 103C at the center of the solvent separating unit 1030.

Figure 17:
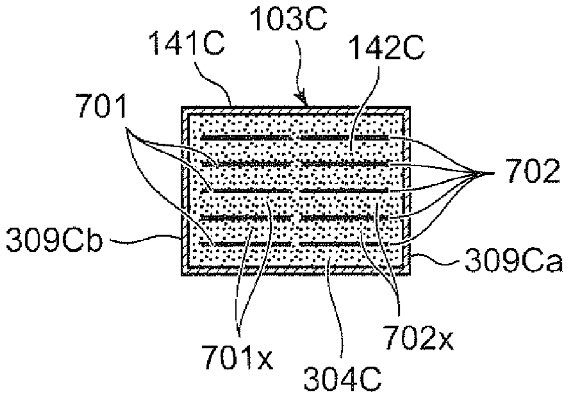
FIG. 17 is a cross-sectional view of a flow path after the integration processing is applied in a state where cross sections of a large number of flow paths of the solvent separating unit according to the eighth embodiment of the present invention are overlapped with each other.

FIG. 17 is a view obtained by overlapping cross sections orthogonal to the flow of exhaust atmospheric gas 301 which are taken at predetermined pitches of the electrodes 701, 702 from a cross section A-A to a cross section B-B in the solvent separating unit 103C shown in FIG. 16. That is, a large number of electrodes 701, 702 are arranged such that all cross sections in the direction orthogonal to the direction that the gas (exhaust atmospheric gas 301) flows fall within the range of the electric field by integrating electric fields 304C generated by applying voltages to the electrodes 701, 702 on cross sections in the direction orthogonal to the direction that a gas flows within a range from a position of a leading end of the flow path before branching (position taken along the cross section A-A) to a position where the flow path is branched (position of the outlet) (position taken along the cross section B-B). Due to such a constitution, the electric fields 304C which are generated by applying voltages to the first electrode 701 and the second electrode 702 by the voltage applying apparatus 108 (a region hutched with fine dots in FIG. 13) extend over the whole width as well as over the whole height of the flow path 142C. Accordingly, the solvent (particles of solvent) 302 having a polarity and contained in the exhaust atmospheric gas 301 which flows in the solvent separating unit 103C never fail to receive an induction effect of the electric field 304 in the course of flowing through the flow path 1420 in the solvent separating unit 103 and are attracted to the electrodes 303.

According to the eighth embodiment, it is possible to also acquire advantageous effects of the sixth embodiment. Further, in the eighth embodiment, the electrodes 701, 702 to which the solvent 302 is electrostatically induced are present in two directions with respect to the flow path 142C. Accordingly, when a diameter of a duct and an exhaust flow rate in this embodiment are equal to that of the sixth embodiment, a path length required to complete the separation of the solvent 302 can be halved in this embodiment compared to the sixth embodiment.

(Modification)

The present invention is not limited to the embodiments, and various modifications are conceivable.

In all cases shown in FIG. 12A to FIG. 17, for example, the heat insulation working may be performed such that a heat insulating material 144 is arranged so as to cover an outside of the solvent separating unit 103, 103B, or 103C and the exhaust duct 308, 307, 703, or 704. When a temperature of the exhaust atmospheric gas 301, 306, or 305 which flows within a range from the solvent separating unit 103, 103B, or 103C to the exhaust duct 308, 307, 703, or 704 is equal to an in-furnace temperature of the heat treatment apparatus 101 due to such heat insulation, the solvent 302 is discharged to the outside of the solvent separating unit 103, 103B, or 103C while keeping a vaporized state. Even when a temperature of the exhaust atmospheric gas 301, 306, or 305 which flows within a range from the solvent separating unit 103, 103B, or 103C to the exhaust duct 308, or 307 becomes lower than an in-furnace temperature in the heat treatment apparatus 101, a part of the solvent is collected in a condensate state in the vicinity of the electrode 303, 701, or 702 to which the solvent is attracted due to a charge. As a result, only the exhaust atmospheric gas 306 containing no solvent 302 is discharged to the duct 308 through which the purified atmosphere gas is discharged.

Figure 18:
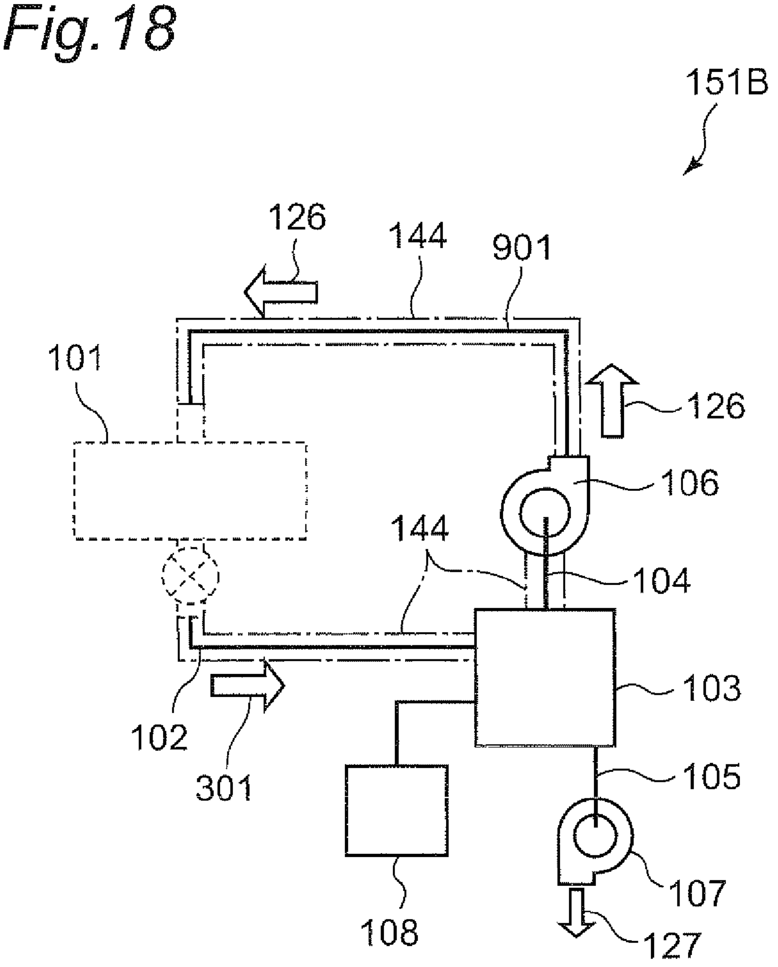
FIG. 18 is a schematic view of a solvent separating apparatus according to a modification of the eighth embodiment according to the present invention which performs the supply and the discharge of an atmospheric gas to and from a heat treatment apparatus.
Figure 19:
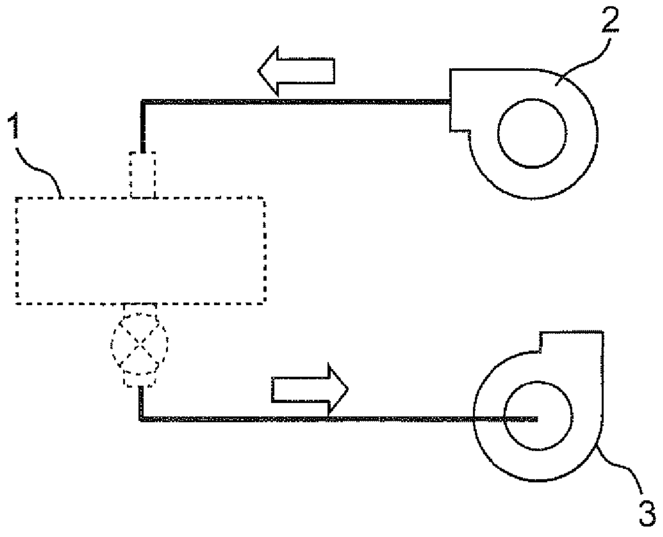
FIG. 19 is an explanatory view for describing the conventional supply and discharge of an atmosphere.
Figure 20:
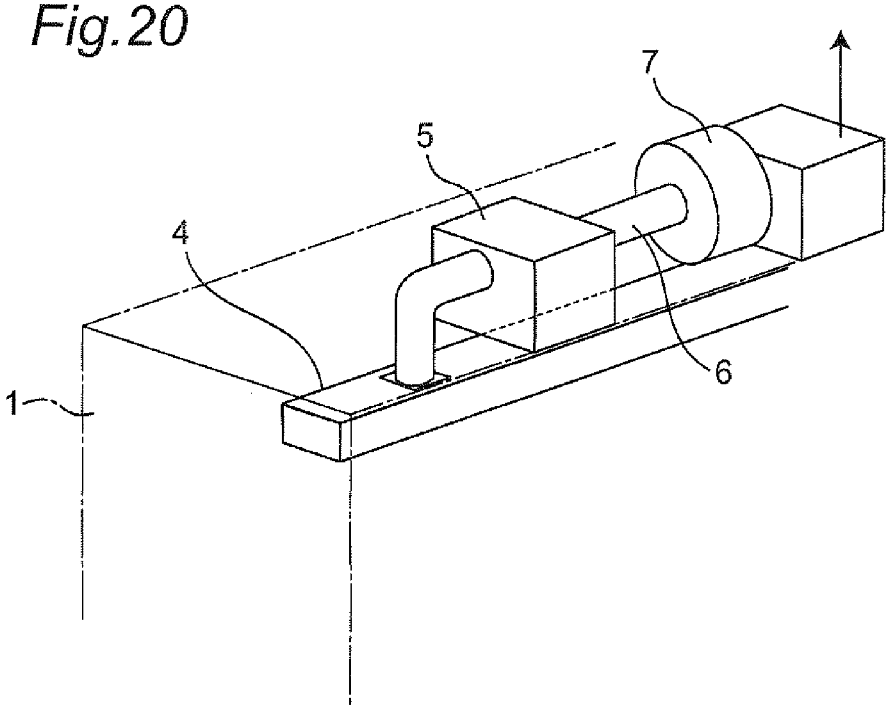
FIG. 20 is an explanatory view of a conventional exhaust purifying apparatus.
Figure 21:
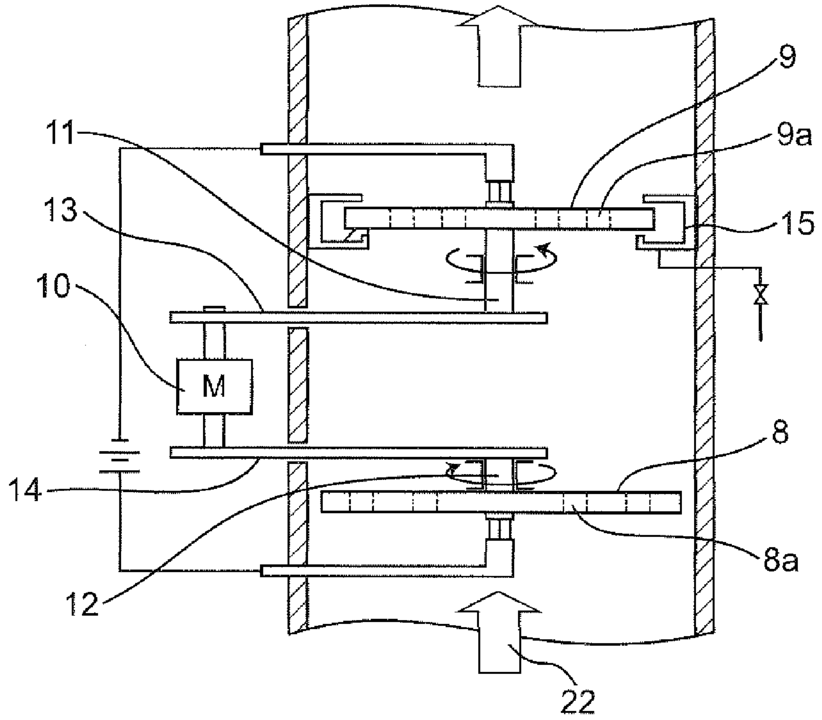
FIG. 21 is an explanatory view of a conventional exhaust purifying apparatus.

FIG. 18 shows the constitution of a solvent separating apparatus 151D as a modification of the previously-described embodiment. In this modification, a purified exhaust atmospheric gas is returned to the inside of a heat treatment apparatus 101 through a circulation duct 901 by circulation instead of discharging an exhaust atmospheric gas to the outside of the heat treatment apparatus 101.

That is, the solvent separating apparatus 151D shown in FIG. 18 is connected to the heat treatment apparatus 101, and includes; an exhaust duct 102; a solvent separating unit 103; a second exhaust duct 104; a first exhaust duct 105; a second exhaust blower 106; a first exhaust blower 107; a voltage applying apparatus 108; and a circulation duct 901. An upstream side of the flow path 142, 142B, or 142C through which a gas flows in the solvent separating unit 103, 103B, or 103C is connected to an exhaust port of the heat treatment apparatus 101 which is a generation source of generating a gas containing a vaporized solvent 302 having a polarity, through the exhaust duct 102. With respect to the flow path 142, 142B, or 142C in the solvent separating unit 103, 103B, or 1030, a second exhaust duct 104 which is branched from the flow path 142, 142B, or 1420 and through which a gas containing no solvent 302 flows is connected to a gas supply port of the heat treatment apparatus 101, through the second exhaust blower 106. Due to such a constitution, a circulation flow path is formed between the solvent separating unit 103, 103B, or 103C and the heat treatment apparatus 101. Accordingly, a purified exhaust atmospheric gas 126 from which the solvent 302 is removed is discharged to a second exhaust blower 106 side which is communicably connected to a downstream, and is introduced into the inside of the heat treatment apparatus 101 again by a second exhaust blower 106 through the circulation duct 901.

In this manner, in the case where the purified exhaust atmospheric gas discharged from the solvent separating unit 103, 103B, or 103C is returned to the inside of the heat treatment apparatus 101 by circulation through the circulation duct 901 instead of discharging the purified exhaust atmospheric gas to the outside of the heat treatment apparatus 101, the purified exhaust atmospheric gas is not positively cooled on a circulation path and hence, the heat insulation may be applied by arranging a heat insulating material or the like over the whole circulation path. That is, the heat insulation may be applied by arranging a heat insulating material 144 so as to cover outer sides of the solvent separating unit 103, 103B, or 103C, the exhaust ducts 102, or 104, and the circulation duct 901. When the heat insulation is applied in such a manner, an energy for elevating a temperature of an exhaust atmospheric gas to a furnace temperature again is almost unnecessary when the exhaust atmospheric gas is returned to the heat treatment apparatus 101 by circulation and hence, a consumption energy of a furnace can be suppressed.

In a case where an exhaust atmospheric gas contains a substance other than a vaporized solvent, by arranging the constitution for removing such substance in the path, it is possible to prevent a foreign material from entering a heat treatment apparatus at the time of circulating the exhaust. To be more specific, in a case where an exhaust atmospheric gas contains a substance other than a vaporized solvent, such as oil mist or a dust, for example, a centrifugal separation unit, an electrostatic separation unit, or the like is arranged prior to or after the solvent separating apparatus in the process. Due to such arrangement, it is possible to prevent foreign material from entering the heat treatment apparatus 101. The electrostatic separation unit separates the oil mist or the dust from the exhaust atmospheric gas due to the electrostatic induction by forcibly charging the oil mist or the dust using the corona discharge or the like. In such a case, it is necessary to select a separation method depending on a size of foreign material to be separated or removed.

By suitably combining desired embodiments or modifications out of the above-mentioned embodiments or modifications, the combination can acquire advantageous effects that the desired embodiments or modification acquire respectively.

The solvent separating method and apparatus of the present invention can separate the solvent contained in the exhaust atmosphere without cooling the exhaust atmosphere and hence, the solvent separating method and apparatus of the present invention are applicable to an exhaust generating apparatus of heat treatment apparatuses which perform various heat treatments such as a drying furnace, a baking furnace, a curing furnace, or a reflow furnace used in manufacturing steps of industrial products or household products or in manufacturing steps of various electronic parts as solvent separating method and apparatuses which consume a small amount of energy and a small amount of atmosphere gas.

The entire disclosure of Japanese Patent Application No. 2013-230348 filed on Nov. 6, 2013, No. 2013-272020 filed on Dec. 27, 2013, and No. 2014-140627 filed on Jul. 8, 2014, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of separating a vaporized solvent having polarity from a gas containing the solvent, the method comprising:

flowing the gas in a fixed direction in a flow path in a solvent separating apparatus;

applying an electric field to the gas in a direction which intersects with a direction along which the gas flows due to an electrode arranged in the flow path of the gas in an extending manner along the direction that the gas flows and extended to an inside of one discharge path for discharging the solvent of a plurality of discharge paths, and thus attracting the solvent to an electrode side by electrostatic induction and then collecting the solvent having the polarity and contained in the gas within a fixed region in the flow path, wherein the fixed region is an identical space to the flow path; and while attracting the solvent to the electrode side by the electrostatic induction through the application of the electric field, separating the gas containing the collected solvent from the gas which does not contain the solvent outside the fixed region through the one discharge path of the plurality of discharge paths directly connected to the flow path that are the identical space and discharging the separated gas containing the collected solvent, and discharging the gas which does not contain the solvent outside the fixed region through a discharge path, which is different from the discharge path for discharging the gas containing the collected solvent having the polarity, of the plurality of discharge paths directly connected to the flow path.

2. The solvent separating method according to claim 1, wherein the gas containing the vaporized solvent having the polarity is a heated gas which is generated in an exhaust generating apparatus by heating in the exhaust generating apparatus and is discharged from the exhaust generating apparatus.

3. The solvent separating method according to claim 1, wherein the gas containing the vaporized solvent is exhausted from an exhaust generating apparatus, a gas from which the solvent is separated thus not containing the solvent is separated from the gas containing the solvent, and the gas not containing the solvent is supplied to an inside of the exhaust generating apparatus from the solvent separating apparatus and is circulated in the inside of the exhaust generating apparatus.

4. The solvent separating method according to claim 2, wherein a gas from which the solvent is separated thus not containing the solvent is separated from a gas containing the solvent, and the gas not containing the solvent is supplied to an inside of the exhaust generating apparatus from the solvent separating apparatus and is circulated in the inside of the exhaust generating apparatus.

5. The solvent separating method according to claim 3, wherein the gas containing the vaporized solvent flows through a path from the exhaust generating apparatus to the solvent separating apparatus in a state where a path through which the gas is circulated between the exhaust generating apparatus and the solvent separating apparatus is thermally insulated from outside air by a heat insulating material, and a gas from which the solvent is removed flows through a path from the solvent separating apparatus to the exhaust generating apparatus.

6. The solvent separating method according to claim 4, wherein the gas containing the vaporized solvent flows through a path from the exhaust generating apparatus to the solvent separating apparatus in a state where a path through which the gas is circulated between the exhaust generating apparatus and the solvent separating apparatus is thermally insulated from outside air by a heat insulating material, and a gas from which the solvent is removed flows through a path from the solvent separating apparatus to the exhaust generating apparatus.

* * * * *